United States Patent
Jamkhedkar et al.

(10) Patent No.: US 11,734,658 B2
(45) Date of Patent: Aug. 22, 2023

(54) TRANSACTIONS BETWEEN SERVICES IN A MULTI-TENANT ARCHITECTURE

(71) Applicant: PayPal, Inc., San Jose, CA (US)

(72) Inventors: Prashant Jamkhedkar, Fremont, CA (US); Savio A. Menezes, Fremont, CA (US); Sandeep Kumar, Fremont, CA (US); Jacqueline Koesters, Chicago, IL (US); Benjamin Matthew Ronick, San Jose, CA (US); Daniel O'Connor, Chicago, IL (US); Tiffany Wood, Chicago, IL (US); Aravindan Ranganathan, San Jose, CA (US); Norihiro Edwin Aoki, Woodside, CA (US); Jeffrey David Meyer, Los Gatos, CA (US); Justin Matthew White, La Selva, CA (US)

(73) Assignee: PayPal, Inc., San Jose, CA (US)

( * ) Notice: Subject to any disclaimer, the term of this patent is extended or adjusted under 35 U.S.C. 154(b) by 474 days.

(21) Appl. No.: 16/888,260

(22) Filed: May 29, 2020

(65) Prior Publication Data
US 2020/0294008 A1    Sep. 17, 2020

Related U.S. Application Data

(63) Continuation-in-part of application No. 16/457,822, filed on Jun. 28, 2019, now Pat. No. 11,336,453, and
(Continued)

(51) Int. Cl.
  *G06Q 20/10*    (2012.01)
  *G06Q 20/40*    (2012.01)
  *G06Q 20/02*    (2012.01)

(52) U.S. Cl.
  CPC ......... *G06Q 20/102* (2013.01); *G06Q 20/027* (2013.01); *G06Q 20/405* (2013.01)

(58) Field of Classification Search
  CPC .. G06Q 20/102; G06Q 20/027; G06Q 20/405; G06Q 20/356
  See application file for complete search history.

(56) References Cited

U.S. PATENT DOCUMENTS

| 7,657,639 B2 | 2/2010 | Hinton |
| 8,271,536 B2 | 9/2012 | Amradkar et al. |

(Continued)

OTHER PUBLICATIONS

Jones et al., "JSON Web Token (JWT)," Standards Track, May 2015.
(Continued)

*Primary Examiner* — Michael A Keller
(74) *Attorney, Agent, or Firm* — Kowert, Hood, Munyon, Rankin & Goetzel, P.C.; Scott W. Pape; Dean M. Munyon

(57) ABSTRACT

A method for facilitating transactions by tenants in a multi-tenant architecture system is discussed. The method includes generating, with a multi-tenant computer system, a first representation of an entity in a first hierarchical data structure associated with an entity interface tenant of the multi-tenant computer system. The method includes receiving, with the multi-tenant computer system, a set of entity-specific policies useable to generate requests to individual ones of a plurality of transaction processing computer systems. The method includes generating, with the multi-tenant computer system, a second representation of the entity in a second hierarchical data structure associated with a particular transaction processing service tenant of a plurality of transaction processing service tenants of the multi-tenant computer system. The method includes linking, with the multi-tenant computer system, the first representation and the second representation in a unified hierarchical data structure useable to provide a unified identity for the entity for requests.

20 Claims, 10 Drawing Sheets

Related U.S. Application Data a continuation-in-part of application No. 16/009,994, filed on Jun. 15, 2018, now Pat. No. 11,030,329.

(56) References Cited

U.S. PATENT DOCUMENTS

| | | | |
|---|---|---|---|
| 8,819,801 | B2 | 8/2014 | Sangubhatla et al. |
| 8,918,641 | B2 | 12/2014 | Smith et al. |
| 9,058,481 | B2 | 6/2015 | Prasad et al. |
| 9,218,599 | B1 | 12/2015 | Hilbring |
| 9,710,664 | B2 | 7/2017 | Sathyadevan et al. |
| 9,781,122 | B1 | 10/2017 | Wilson et al. |
| 10,931,656 | B2 | 2/2021 | Carru et al. |
| 2002/0010591 | A1 | 1/2002 | Pomerance |
| 2004/0117298 | A1 | 6/2004 | Algiene et al. |
| 2005/0261968 | A1* | 11/2005 | Randall .......... G06Q 40/08 705/16 |
| 2006/0059565 | A1 | 3/2006 | Green et al. |
| 2007/0150480 | A1 | 6/2007 | Hwang et al. |
| 2008/0154783 | A1 | 6/2008 | Rule et al. |
| 2008/0288400 | A1* | 11/2008 | Panthaki .......... G06Q 20/1085 705/40 |
| 2009/0125972 | A1 | 5/2009 | Hinton et al. |
| 2011/0276892 | A1 | 11/2011 | Jensen-Horne et al. |
| 2012/0072307 | A1 | 3/2012 | Kassaei et al. |
| 2012/0197963 | A1 | 8/2012 | Bouw et al. |
| 2013/0046600 | A1 | 2/2013 | Coppinger |
| 2013/0318241 | A1 | 11/2013 | Acharya et al. |
| 2014/0230076 | A1 | 8/2014 | Micucci et al. |
| 2015/0161620 | A1 | 6/2015 | Christner |
| 2015/0193775 | A1 | 7/2015 | Douglas et al. |
| 2015/0193858 | A1 | 7/2015 | Reed et al. |
| 2015/0348003 | A1* | 12/2015 | Reader .......... G06Q 30/02 705/16 |
| 2016/0087960 | A1 | 3/2016 | Pleau et al. |
| 2016/0092859 | A1* | 3/2016 | Klingen .......... G06Q 20/027 705/44 |
| 2016/0337365 | A1 | 11/2016 | Beiter |
| 2017/0012962 | A1 | 1/2017 | Lissack et al. |
| 2017/0048306 | A1 | 2/2017 | Amador |
| 2017/0318128 | A1 | 11/2017 | Ananthanarayanan et al. |
| 2018/0013763 | A1 | 1/2018 | Wilson et al. |
| 2018/0075231 | A1 | 3/2018 | Subramanian et al. |
| 2018/0081905 | A1 | 3/2018 | Kamath et al. |
| 2019/0014120 | A1 | 1/2019 | Drabant |
| 2019/0026486 | A1 | 1/2019 | Pleau et al. |
| 2020/0007529 | A1 | 1/2020 | Bahrenburg et al. |
| 2020/0412538 | A1 | 12/2020 | Rosado |

OTHER PUBLICATIONS

Ashwini A., "What Are The Pros And Cons Of Muititenancy In Rails Application?", [online], Retrieved from the Internet: https://medium.com/swlh/what-are-the-pros-and-cons-of-multi-tenancy-in-railsapplication, Apr. 30, 2018, 9 pages.

Crown N., "An Introduction to SCIM: System for Cross-Domain System for Cross-Domain Identity Management", RSA Conference Europe 2012 [online], Retrieved on Apr. 24, 2018, Retrieved from the Internet: URL: https://www.rsaconference.com/writable/presentations/file.../iam-107a_crown.pdf, 24 pages.

"Single tenant vs Multi tenant business softwarecommunifire" axero Online, Retrieved on Apr. 30, 2018, Retrieved from the internet: URL: http://axerosolutions.com/blogs/timeisenhauer/pulse/146/single-tenent-vs-multi-tenant-business-software, 9 Pages.

International Appl. No. PCT/US2019/064325, International Search Report and Written Opinion dated Mar. 24, 2020, 16 pages.

International Search Report and Written Opinion from PCT/US19/68993, dated Mar. 31, 2020, 14 pages.

International Search Report and Written Opinion from PCT/US19/68999, dated Mar. 31, 2020, 14 pages.

Kabbedijk J. et al., "Multi-Tenant Architecture Comparison", [Online], Retrieved on Apr. 30, 2018. Retrieved from the Internet: URL: https://pdfs.semanticscholar.org/17fb/e778244aa190da9d56c5fb8c2e64c63cd621.pdf, 8 pages.

Li K. et al., "System for Cross-domain Identity Management: Definitions, Overview, Concepts and Requirements" [online], retrieved on Apr. 24, 2019, Retrieved from the internet: URL: https://tools.ietf.org/html/ric7642, 19 pages.

Microsoft Application Architecture Guide, Chapter 2: Key Principles of Software Architecture, 2nd Edition—Retrieved from the internet: URL: https://docs.microsoft.com/en-us/previous-versions/msp-np/ee658124%28v%3dpandp10%29, Oct. 2009, [Online], Retrieved on Apr. 30, 2018, 6 pages.

"Muiti-tenant Vs. Single-tenant Architecture (SaaS)" Online, retrieved on Apr. 30, 2018, Retrieved from the Internet: URL: https://blogs.sap.com/2015/07/12/multi-tenant-vs-single-tenant-architecture-saas/, 5 pages.

"Multi-tenancy is fundamental to SaaS applications—and it's better for you, too" Sage Intacct Online, Retrieved on Apr. 30, 2018. Retrieved from the Internet: URL: https://www.sageintacct.com/cloud-erp/multi-tenant-cloudarchitecture, 4 Pages.

European Application No. 19819808.7, Extended European Search Report dated Jun. 8, 2021, 7 pages.

International Appl. No. PCT/US2019/037242, International Preliminary Report on Patentability dated Dec. 24, 2020, 12 pages.

International Appl. No. PCT/US2019/037242, International Search Report and Written Opinion dated Oct. 4, 2019, 12 pages.

International Application No. PCT/US2019/064325, International Preliminary Report on Patentability dated Jun. 17, 2021, 6 pages.

International Application No. PCT/US2019/068993, International Preliminary Report on Patentability dated Jul. 8, 2021, 8 pages.

International Application No. PCT/US2019/068999, International Preliminary Report on Patentability dated Jul. 8, 2021, 7 pages.

International Application No. PCT/US2019/068999, International Search Report and Written Opinion dated Mar. 31, 2020, 8 pages.

Solanki N., et al., "Multi-Tenant Access and Information Flow Control for SaaS", IEEE International Conference on Web Services, Jun. 27, 2016, Retrieved from the Internet URL: https://ieeexplore.ieee.org/document/7557990, Retrieved on Mar. 3, 2021, 8 pages.

\* cited by examiner

TRANSACTIONS BETWEEN SERVICES IN A MULTI-TENANT ARCHITECTURE

The present application is a continuation-in-part of U.S. application Ser. No. 16/457,822, filed Jun. 28, 2019, and is also a continuation-in-part of U.S. application Ser. No. 16/009,994, filed Jun. 15, 2018. U.S. application Ser. No. 16/457,822 is itself a continuation-in-part of U.S. application Ser. No. 16/009,994. The disclosures of each of the above-referenced applications are incorporated by reference herein in their entirety.

BACKGROUND

Embodiments of the present disclosure generally relate to the field of software architecture and, more particularly, to managing how various entities are on-boarded, managed, and/or accessed in a multi-tenant system architecture.

Complex software systems can have various architectures, including a single-tenant software architecture and a multi-tenant software architecture, among others. In a single-tenant software architecture, each entity (such as a company or a portion of that company) can have their own instances of each software application, data, and any supporting infrastructure. In a single-tenant architecture, the software for each tenant entity can be customized as desired. However, drawbacks of using the single tenant architecture include expense in resources, as well as requirements to host, customize, and maintain separate software applications for each tenant.

In contrast, in a multi-tenant software architecture, each entity can share the same instances of applications, data, and/or infrastructure. A multi-tenant software provider can provision their applications and/or resources to multiple entities from a single software architecture. In multi-tenant software architecture, access to data can be shared among the various entities. By sharing much of the applications, data, and software; various resources such as installation, configuration, number of physical servers, maintenance, and even power can be optimized. However, drawbacks of using multi-tenant architecture include complexity of managing how multiple software applications are configured and shared among multiple clients. Also, design of multi-tenant architecture-based software systems that provides secure and reliable access to the data, resources, and/or transaction services that operate using the data and/or resources can be problematic. Furthermore, interoperability difficulties may arise when using software applications, in a multi-tenant architecture system, that were initially managed and/or hosted by different businesses.

BRIEF DESCRIPTION OF THE DRAWINGS

The present embodiments may be better understood, and numerous objects, features, and advantages made apparent to those skilled in the art by referencing the accompanying drawings.

Figure 1:
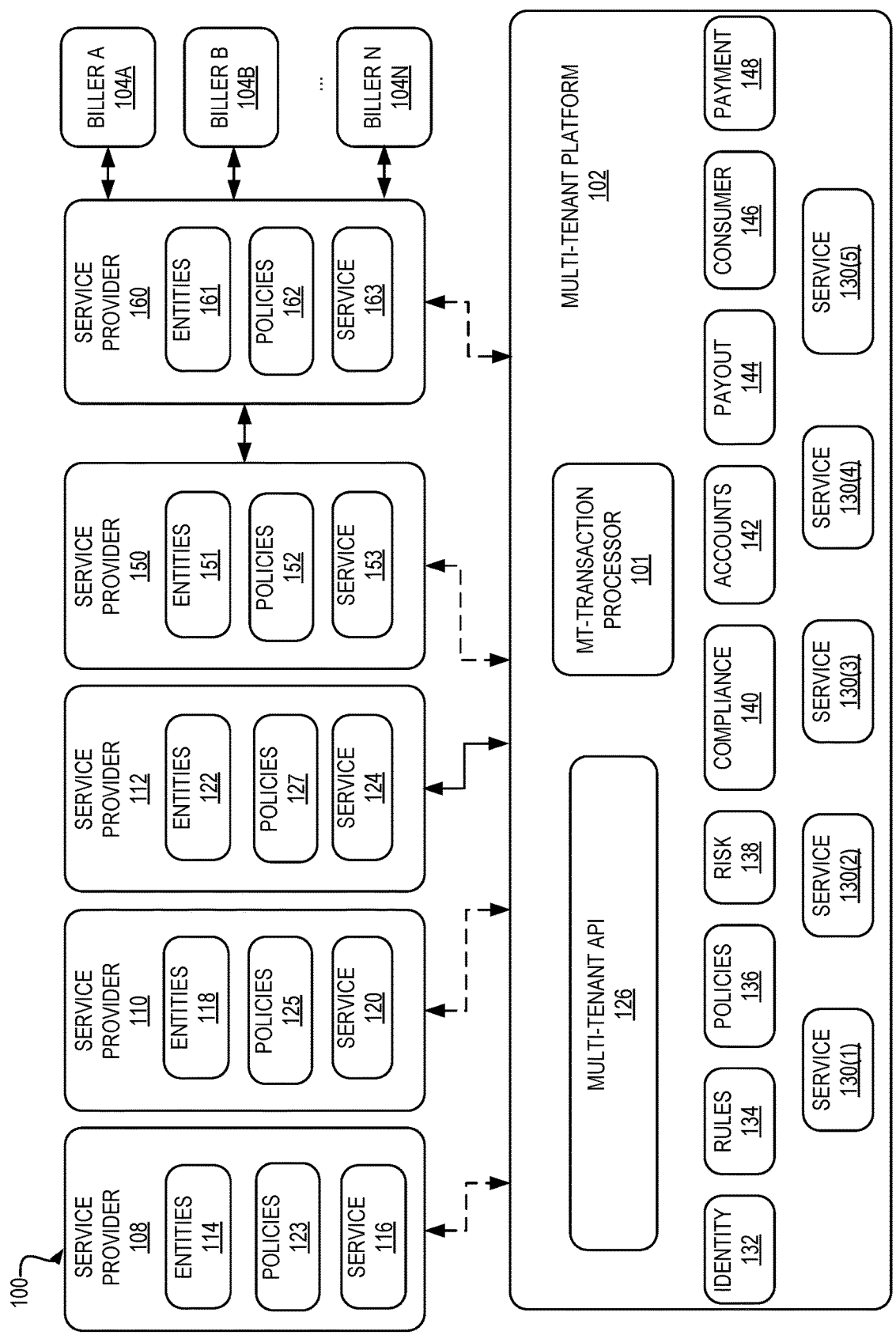
FIG. 1 is a system diagram illustrating embodiments of a multi-tenant software architecture system that can be accessed by communicating with a user device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" service providers would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "platform" refers to an environment that includes a set of resources that enables some functionality (for example, in the context of the present disclosure, automated decision making). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, an automated decision-making platform according to the present disclosure provides resources for performing automated decision making; users may utilize the platform to carry out instances of automated decision making. Embodiments of the automated decision-making platform described herein thus enable the functionality of automated decision making to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others.

In a multi-tenant software architecture described herein, each tenant can share the applications, data, and/or infrastructure. A multi-tenant software provider can use a multi-tenant software platform to provision applications and/or resources to multiple entities. The multi-tenant software platform can facilitate addition of new tenants and on-board data and/or services provided by these new tenants. The multi-tenant software platform can use identity services to provide access to these services, such as from an entity associated with one tenant to a service provided by another tenant. The multi-tenant software platform can also implement rules and policies for data access by various entities across the tenants (e.g., access by a first service of a first tenant to access a second service of a second tenant to perform a transaction).

The multi-tenant software platform (also referred to as a multi-tenant platform) can include multiple tenants that have been previously on-boarded. The multi-tenant platform can facilitate access, using a unified identity associated with a user, to the entities, policies, and services of these tenants. The tenants can be hosted and managed by service providers. Access to the services can be determined based on privileges of the unified identity, as well as on policies of each of the tenants. The services can include various merchant services, such as in-store check-out (at a certain tenant) via a user device (associated with the unified identity), access to an online store of the tenant, order-ahead at a certain store of the tenant, a cash-in process (e.g., at an Automated Teller Machine (ATM)) at a certain tenant, a cash-out process (e.g., at an ATM), self-checkout for fuel at pay-at-the-pump stations of the tenant, securely storing funding instruments for use in transactions (also referred to as vaulting funding instruments), among others. Additionally, as discussed herein, the services include generating bills for a biller's customers, requesting payment for such bills, and processing payment by the biller's customers. The services can include SaaS and Platform as a Service (PaaS) services and/or other cloud services that are accessible by the user device. For example, the solution provider can provide access, to the user device, to various software applications, or deliver such software to the user device.

The multi-tenant platform can thus utilize unified identity services to provide access to selected services and/or data of the tenants based on policies associated with each of the tenants. The multi-tenant platform can use separate databases to store data to achieve isolation, such as when new tenants are on-boarded onto the existing platform, and providing logical and/or physical data isolation. Shared data access can be made possible by on-boarding the tenants and selectively cross-exposing services. For example, for a multi-tenant platform managed by PAYPAL, certain capabilities of the multi-tenant platform such as Risk-as-a-Service (RaaS) can be provided to certain users of on-boarded tenants such as XOOM. Similarly, certain capabilities of XOOM such as Fund Sending can be provided to certain users of PAYPAL and capabilities of BRAINTREE such as Vaulting can be provided to certain users of PAYPAL. Thus, in some embodiments, the multi-tenant platform can include a core tenant (such as PAYPAL) that offers core services and infrastructure (including Identity-as-a-Service (IaaS) functionality) and any additional data access to selected tenants and/or users accessing the multi-tenant platform from that tenant. The techniques disclosed herein, however, are not limited to providing access from a core tenant to another tenant. In various embodiments, any service of any tenant can be accessed by a service of another tenant subject to rules and/or policies as discussed herein. The level of access to the core services and/or infrastructure (or access to a tenant's services by services of other tenants) can be determined by rules and/or policies of each tenant and/or of the multi-tenant platform.

The multi-tenant platform can onboard new tenants as needed by using one or more hierarchical data structures. In some embodiments, the multi-tenant platform can expose appropriate user experiences for a user application based on the user request. The multi-tenant platform can implement methods for providing IaaS services to various entities and/or tenants. The multi-tenant platform can provide the IaaS and other services based on the hierarchical data structures. As discussed below, the multi-tenant platform can process user requests (e.g., from users of the core tenant or from users of an on-boarded tenant) and determine how to access a certain service.

In some embodiments, the multi-tenant platform can receive a request, at a first service provider, to provide a service for a user. The multi-tenant platform can access a representation of a second service provider in a first hierarchical data structure managed by the first service provider. In some embodiments, the multi-tenant platform is the first service provider that can provide certain services to entities that are referenced via identifiers determined using IaaS. The multi-tenant platform can determine that user data required for the service is managed by the second service provider that manages user identity of the user. The multi-tenant platform can determine that the representation is linked with a full identity reference for the second service provider in a second hierarchical data structure managed by the second service provider. The multi-tenant platform can access the user data at the second hierarchical data structure using the full identity reference. The multi-tenant platform can access the service via the lightweight identity reference and using the user data at the first service provider. The following description and associated Figures illustrate various embodiments directed to the ideas listed above.

FIG. 1 is a system diagram illustrating embodiments of a multi-tenant software architecture system that can be accessed by communicating with a user device. In an overview of the system diagram 100, a plurality of billers 104A-N can communicate with multi-tenant platform 102 via a service provider 160. The multi-tenant platform 102 can provide access to multiple service providers 108, 110, 112, 150, and 160. The multi-tenant platform 102 includes core services at elements 132-148, as well as additional services 130(1)-130(5). The multi-tenant platform 102 can provide services to the service providers 108, 110, 112, 150, 160, such as IaaS services that may be required for accessing other services. In various embodiments, the multi-tenant platform 102 can facilitate accesses by a service 116, 120, 124, 153, 163 of a service provider 108, 110, 112, 150, 160 to a service 116, 120, 124, 153, 163 of another service provider 108, 110, 112, 150, 160 (e.g., facilitating access by service 116 of service provider 108 to service 124 of service provider 112). Thus, the multi-tenant platform 102 can manage a plurality of tenants, each one of which can be associated with one or more services, which are then exposed for access. In various embodiments, multi-tenant platform 102 is implemented using a computer system (e.g., a laptop computer, a desktop computer, a server) or a plurality of computer systems (e.g., a cloud of servers).

In various embodiments, the services 116, 120, 124, 153, 163 of service providers 108, 110, 112, 150, 160 are operable to transactions between an end user of a biller 104 (e.g., biller A 104A) to biller A 104A. In various embodiments, a first service provider 108, 110, 112, 150, 160 is a bill payment platform and a second service provider 108, 110, 112, 150, 160 is a payment processing platform, and the transaction is a payment to biller A 104A for a bill by the end user of biller A 104A. As discussed in further detail herein in reference to FIGS. 4, 5, and 6, the bill payment platform is operable to interface with billers 104A-N to enable generation of bills and initiating transactions to settle such bills. In various embodiments, bill payment platform provides one or more services to biller A 104A (e.g., interfacing with a website of biller A 104A, interfacing with an app of biller A 104A) operable to receive payment information from end users to perform a transaction to pay bill (e.g., a type of payment for the transaction, an indication of the end user's payment account). Bill payment platform also provides a service (e.g., service 163 of service provider 160) operable to interface with another service (e.g., services 116, 120, 124, 153) to perform the transaction using the payment information. Because bill payment platform interfaces with biller A 104A, bill payment platform is also referred to herein as an "entity interface tenant" of multi-tenant platform 102.

In various embodiments, such other services (e.g., services 116, 120, 124, 153) are operable to interface with payment processing computer systems 620 (shown in FIG. 6) to perform the transaction. There other services are also referred to herein as "transaction processing services tenant" of multi-tenant platform 102. In various embodiments, the various other services are operable to perform transaction using different forms of payment. In various embodiments, service 116 of service provider 108 is operable to process transactions using a peer-to-peer payment processing system (e.g., VENMO) that allows users to send, accept, and request fund transfers. In various embodiments, service 124 of service provider 112 is operable to process transactions using a different peer-to-peer payment processing system (e.g., PAYPAL). In various embodiment, service 153 of service provider 150 is operable to process transactions using credit cards and ACH transfers. In various embodiments, a result of such bill payment transactions is a deposit of funds into a settlement account associated with multi-tenant platform 102. These bill payment transactions are discussed in further detail in reference to FIGS. 6 and 9. In various embodiments, service 120 of service provider 110 is operable to perform payout transaction in which funds in the settlement account are transferred to a financial account of a biller A 104A. These payout transactions are discussed in further detail in reference to FIG. 6.

The multi-tenant platform 102 can store user information for users at the accounts 142. In some embodiments, the accounts 142 includes information for users (also referred to as "core users") of a core tenant. The core tenant can be one of the service providers 108, 110, 112, 150, 160 or a service provider that is fully integrated into the multi-tenant platform 102. The multi-tenant platform 102 can facilitate provision of various core services to the core users. The core services can include identity services 132, risk services 138, compliance services 140, payout services 144, consumer services 146, and payment services 148. In one embodiment, the multi-tenant platform 102 provides IaaS services at the identity services 132 element. The identity services 132 can generate and maintain a core hierarchical data structure for managing its core entities. The core services can also include access to policy configuration 136, as well as access to accounts 142 and consumers 146. The accounts 142 are associated with the identity services 132. In various embodiments, payout service 144 interfaces with one or more transaction processing computer systems 620 (as discussed herein in connection to FIG. 6).

The service provider 108 can include entities 114, policies 123, and services 116. Similarly, the service providers 110, 112, 150, and 160 include certain elements of entities 118, 122, 151, and 161; policies 125, 127 152, and 163; and services 120, 124, 153, and 163, respectively. In some embodiments, a certain service provider can be fully integrated onto the multi-tenant platform 102, a process which can include generating the core hierarchical data structure for the core tenant. In this example, the identity services 132 can manage the core users, meaning that the service provider 108 does not have its own identity service for its own users. Alternatively, the service providers 108, 110, 112, 150, and/or 160 can be on-boarded onto the multi-tenant platform 102 and manage their own identities. Any access from a service provider 108, 110, 112, 150, 106 for access of a service other than its own services 116, 120, 124, 153, 165; such as access of a service 130(1) or access to a service 116, 120, 124, 153, 165 of another service provider 108, 110, 112, 150, 160; uses a unified identity for access of services and/or data across the multi-tenant platform 102, in various embodiments.

The respective policies 123, 125, 127, 152, 162 of the various service providers 108, 110, 112, 150, 160 are configurations that apply to the storage or operation of the service provider's 108, 110, 112, 150, 160 respective entities 114, 118, 122, 151, and 161 and/or services 116, 120, 124, 153, and 163. In various embodiments, policies 123, 125, 127, 152, 162 include but are not limited to operational policies that enable, disable, or configure operational risk restrictions (e.g., policies associated with the credit worthiness of the various billers 104A-N); financial policies that enable, disable, or configure financial risk restrictions; form of payment policies that provision and enable processing for different forms of payment (e.g., policies for peer-to-peer payment, policies for credit card payment, policies for ACH payment); namespace policies that provision tenant hierarchy-specific namespaces; settlement cutoff policies that customize settlement cutoffs for individual forms of payment; next day funding policies that enable next day funding for individual payment methods; ledger policies that enable configuration of ledger accounts (e.g., ledger entities 410 discussed in connection to FIG. 4); compliance policies that relate to government or organization regulatory policies; billing policies that relate to how entities using a particular service provider are charged; and/or payout policies that relate to how entities using a particular service are paid out. In various embodiments, some or all of these policies are useable to generate requests to individual ones of a plurality of transaction processing computer systems corresponding to various forms of payment or payouts, as discussed in further detail in reference to FIGS. 6 and 7. In some instances, various individual policies of the policies 123, 125, 127, 152, 162 apply to all of the corresponding service provider's entities and services, whereas other individual policies apply to a particular form of payment, but not other forms of payment. Accordingly, in various instances, a subset of policies 123, 125, 127, 152, 162 applies to transaction requests made by the corresponding service provider using a particular form of payment. In various embodiments, various ones of the policies 123, 125, 127, 152, 162 are customizable according to settings input by users associated with the various service providers and/or input by various billers 104A-N. For example, a particular biller A 104A may set a particular customized settlement cutoff policy.

The multi-tenant platform 102 can onboard the service providers 108, 110, 112, 150, 160. As discussed below, the onboarding process can include accessing identity services of the services providers 108, 110, 112, 150, 160 to determine at least a portion of the entities that are being managed by the respective identity service. If the entities are not being migrated (e.g., by being fully integrated) to the identity services 132, then the identity services 132 can generate representations (also referred to herein as models) of the entities being on-boarded in the core hierarchical data structure. In various embodiments, these representations are then used by the IaaS service to determine and use the unified identity (for a certain user) across the multi-tenant platform 102. The representations can include lightweight elements and/or linked elements. The identity services 132 can manage and access the policy configuration 136, such as to enforce access to certain customer and/or merchant domains. The policy configuration 136 can be accessed via the hierarchical data structures (discussed below) for each entity. The process of generating and using user representations is explained in more detail below. For simplicity, FIG. 1 only shows an onboarded core service provider 112 (represented by the solid line connecting service provider 112 to multi-tenant platform 102), but, the multi-tenant platform 102 can onboard multiple tenants in addition, or instead of, to the ones shown. The multi-tenant platform 102 can also have multiple core tenants that are incorporated as part of the core services 132-148.

The multi-tenant platform 102 can communicate, via the multi-tenant API 126, with the service providers 108, 110, 112, 150, 160 and/or the plurality of billers 104A-N. The multi-tenant platform 102 can provide, based on a certain unified identity, information related to a tenant, associated services, and/or associated user experiences, to a requesting entity via the multi-tenant API 126. Furthermore, the multi-tenant platform 102 can facilitate communication between various service providers 108, 110, 112, such as by providing IaaS services and use of unified identity.

For example, as discussed in more detail with reference to FIG. 5, a new tenant, such as the service provider 160, can be on-boarded by the multi-tenant platform 102. Information on the new tenant can be stored by one or more of the core services 132-148. In some embodiments, one or more of services of the new tenant, such as the service 163, can be exposed for access to other users of the multi-tenant platform 102. In one embodiment, the multi-tenant platform 102 can also generate a service representation 130(5) of the service 163 at the multi-tenant platform 102. Thus, any access from other tenants, such as from the service provider 110), to the service 163 is performed via a unified identity (e.g., by using IaaS) at the service representation 130(5). In various embodiments, on-boarding a new tenant includes provisioning representations of entities associated with the new tenant (e.g., users or customers of the new tenant) within one or more hierarchical data structures. As discussed herein, such representations include representations of the various entities with a hierarchical data structure maintained by multi-tenant platform 102, and hierarchical data structures maintained by the various services providers 108, 110, 112, 105, and/or 160.

The plurality of billers 104A-N are examples of a plurality of entities that can interface with a service provider 160 to access other components shown in system diagram 100. In various embodiments, such entities interface with service provider 160 which in turn interfaces with service providers 108, 110, 112, and 150 directly or via multi-tenant platform 102. As discussed herein, in various embodiments such entities are billers 104A-N (e.g., electric utilities) that use service provider 160 to settle bills (e.g., utility bills) and to receive payments from end users of the billers 104A-N (e.g., people who have purchased electricity). These entities may interface with service provider 160 using any type of a computing device that can communicate user requests to service provider 160. In various embodiments, such a computing device can generate and communicate a user request for service 163 at the service provider 160. A plurality of end users (not shown) may interact with billers 104A-N via computing devices (e.g., desktop, laptop, or tablet computers, mobile phones, etc.) to request transaction to pay a bill. As discussed herein in further detail in reference to FIGS. 3, 4, and 5, in various embodiments there may be any number of billers 104A-N. The various billers 104A-N are associated with one or more respective biller accounts (e.g., financial accounts associated with the biller A 104A) that are usable to receive payouts and issue refunds.

In various embodiments, a plurality of the tenants, such as the core service provider 112 or other service providers 108, 110, 150, can implement one or more payment system functions. While the embodiments described in this paragraph relate to embodiments in which one of the tenants is a core service provider that is involved in a transaction between respective services of two tenants, in various other embodiments neither tenant in the transaction is a core service provider 112. In these embodiments, the core service provider 112 (that is integrated into the multi-tenant platform 102) can process a payment to pay for a bill. As discussed in further detail in reference to FIG. 6, the core service provider 112 (or other service providers 110, 112, 150) are operable to communicate with one or more transaction processing computer system 620 to process such payments. The core service provider 112 can perform risk analysis (e.g., via the risk core service 138) to determine whether or not to perform a certain service and/or process a payment for that service. In some embodiments, the core service provider 112 can perform risk and/or verification services for a new service provider 112 (i.e., a new tenant) being on-boarded by the multi-tenant platform 102.

The core service provider 112 can process payments to and from the biller account that is associated with a particular biller 104 (e.g., biller A 104A). The core service provider 112 can provide financial services, such as a fund transfer (e.g., a transfer of a certain monetary amount), to biller A 104A. The core service provider can include payment accounts, each of which can be associated with a biller A 104A or an end user of biller A 104A. Once on-boarded as a core tenant, the accounts of the core service provider can be stored and accessed directly at the multi-tenant platform at the accounts 142 element. For example, a biller A 104A can be associated with one payment account, and the end user can be associated with another payment account at the payment system. Upon successfully performing the risk analysis on the requested service (e.g., a requested transaction between tenants), the core service provider can then perform (e.g., via the payment core service 148) a fund transfer from the end user's payment account to the biller's payment account.

In various embodiments, two tenants (e.g., two of service providers 108, 110, and 112, 150, 160) can engage in transactions between their respective services as discussed in further detail herein in reference to FIGS. 5, 6, 7, 8, and 9. In such embodiments, a first service (e.g., service 163) of a first tenant (e.g., service provider 160) of the multi-tenant platform 102 receives a request to perform a transaction. In various embodiments, the first request includes an indication of a particular form of payment to be used in the transaction. The first tenant sends to a second tenant (e.g., service provider 108, 110, 112, or 150) a second request to use a service (e.g., service 116, 120, 124, 153) provided by the second tenant to perform the transaction using the particular form of payment. Using the unified identity services provided by multi-tenant platform 102, the service provided by the second tenant performs the transaction using the particular form of payment (e.g., by sending a transaction request to a particular one of the plurality of transaction processing computer system corresponding to the particular form of payment) according to a particular subset of policies of the set of policies corresponding to the particular form of payment.

Accordingly, multi-tenant platform 102 is operable enable transactions between services operating within multi-tenant platform 102. Moreover, because additional service providers can be onboarded and added to multi-platform 102, additional entity interface tenants and/or additional transaction processing service tenants which are operable to process additional forms of payment. Thus, the functionality described herein is modular and may be expanded such that multi-tenant platform 102 enables transactions between multiple entity interface tenants and any number of bill payment platforms operable to process and number of forms of payment.

Figure 2:
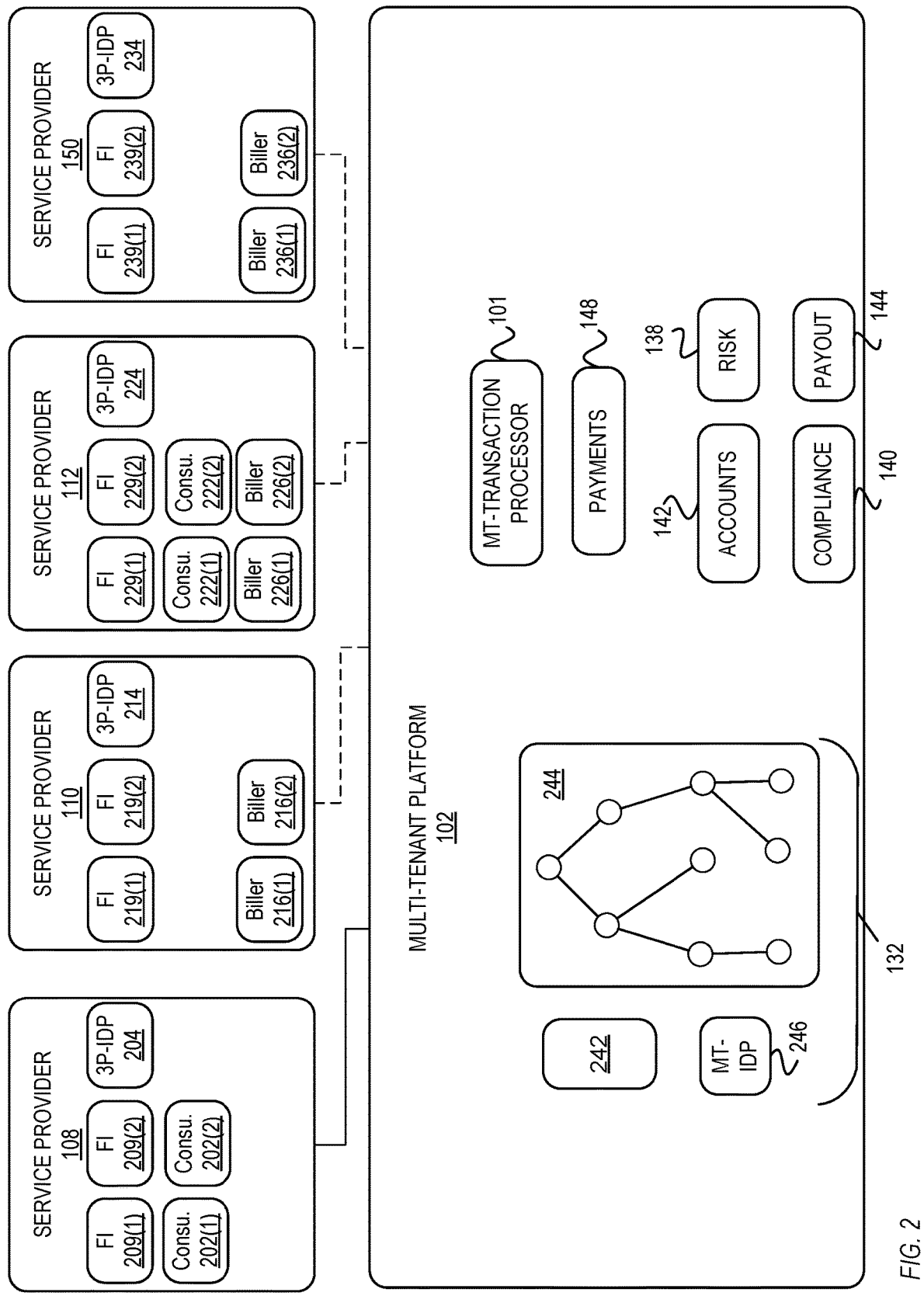
FIG. 2 is a system diagram illustrating embodiments of the multi-tenant software architecture of FIG. 1 including unified identity services.

FIG. 2 is a system diagram illustrating embodiments of the multi-tenant software architecture of FIG. 1 including unified identity services. FIG. 2 shows embodiments of how the identity services are implemented by each of the service providers 108, 110, 112, 150, and 160, as well as by the multi-tenant platform 102. As shown, the service provider 108 can include a third-party identity provider (3P-IDP) 204 that manages entities of consumers 206(1) and 206(2) and corresponding funding instruments (FI) 209(1) and 209(2). Similarly, the service provider 110 can include a 3P-IDP 214 that manages biller entities 216(1) and 264(2) and corresponding FI 219(1) and 219(2). As discussed herein, service provider 112 is a peer-to-peer payment processing system and therefore can include a 3P-IDP 224 that manages entities of both consumers 222(1) and 222(2) and billers 226(1) and 226(2) and a plurality of FI 229(1) and 229(2). The service provider 150 can include a 3P-IDP 234 that manages entities of billers 236(1) and 236(2) and corresponding FI 239(1) and 239(2). The multi-tenant platform 102 includes the identity service 132, the accounts 142 element, the risk 138 element, as well as services 130(1) and 130(2). In some embodiments, the 3P-IDPs 204, 214, 224, 234 are representations (in the hierarchical data structure 244) of the actual IDPs provided by the service providers 108, 110, 112, 150.

In the embodiments shown in FIG. 2, the service provider 110 can be on-boarded by the multi-tenant platform 102, but not fully integrated. Thus, a dashed line is shown that indicates the on-boarded but not fully integrated status of the service provider 110. Alternatively, service providers can be fully integrated with the multi-tenant platform 102 by being made core to the multi-tenant platform 102. In various embodiments, identity service 132 includes an access tier 242 and the hierarchical data structure 244 that is managed by a multi-tenant identity provider (MT-IDP) 246. The multi-tenant platform 102 also includes the services shown in FIG. 1 including 138, 140, 142, 144, and 148.

The access tier 242 is a part of the identity service 132 that customizes data associated with the service provider when being on-boarded with the multi-tenant platform 102. For example, the access tier 242 includes information about the processing of form(s) of payment offered by the service provider 108, as well as service endpoints for accessing services offered by the service provider 108. The service endpoints can be referenced by a corresponding node in the hierarchical data structure 244 for the service provider 108. Various embodiments of how the hierarchical data structure 244 is generated and accessed are discussed below with reference to FIGS. 3 and 4 (e.g., various billers and consumers and their associated funding instruments). In various embodiments, MT-IDP 246 can generate and manage representations of the entities of the service provider 108 being on-boarded (e.g., entities 202(1), 202(2), 209(1), and 209 (2)). Similarly, MT-IDP 246 can generate and manage representations of entities for tenants of service providers 110, 112, 150, and 160.

As discussed, since each of the service providers 108, 110, 112, 150 includes its own 3P-IDP 204, 214, 224, and 234 respectively, each of these tenants continues to manage the identities of their own respective entities. For example, the service provider 110 continues to manage the entities 216 (1)-216(2), including managing identity information, contact data, and any characteristics of the biller entities 216(1) and 216(2). The service provider 110 can update any changes to the entities 216(1) and 216(2) to the multi-tenant platform 102. These 3P-IDP 214 originated updates are used to keep the data of their respective representations up-to-date. Similarly, any services (such as core services) performed via the representations of the hierarchical data structure 244 are also propagated back to the 3P-IDP 212.

Accordingly, a multi-tenant platform 102 enables transactions between services implemented by service providers using the unified identity services to authenticate the parties of the transactions both in a unified hierarchy managed by multi-tenant platform 102 and in tenant hierarchies managed by the various services.

Figure 3:
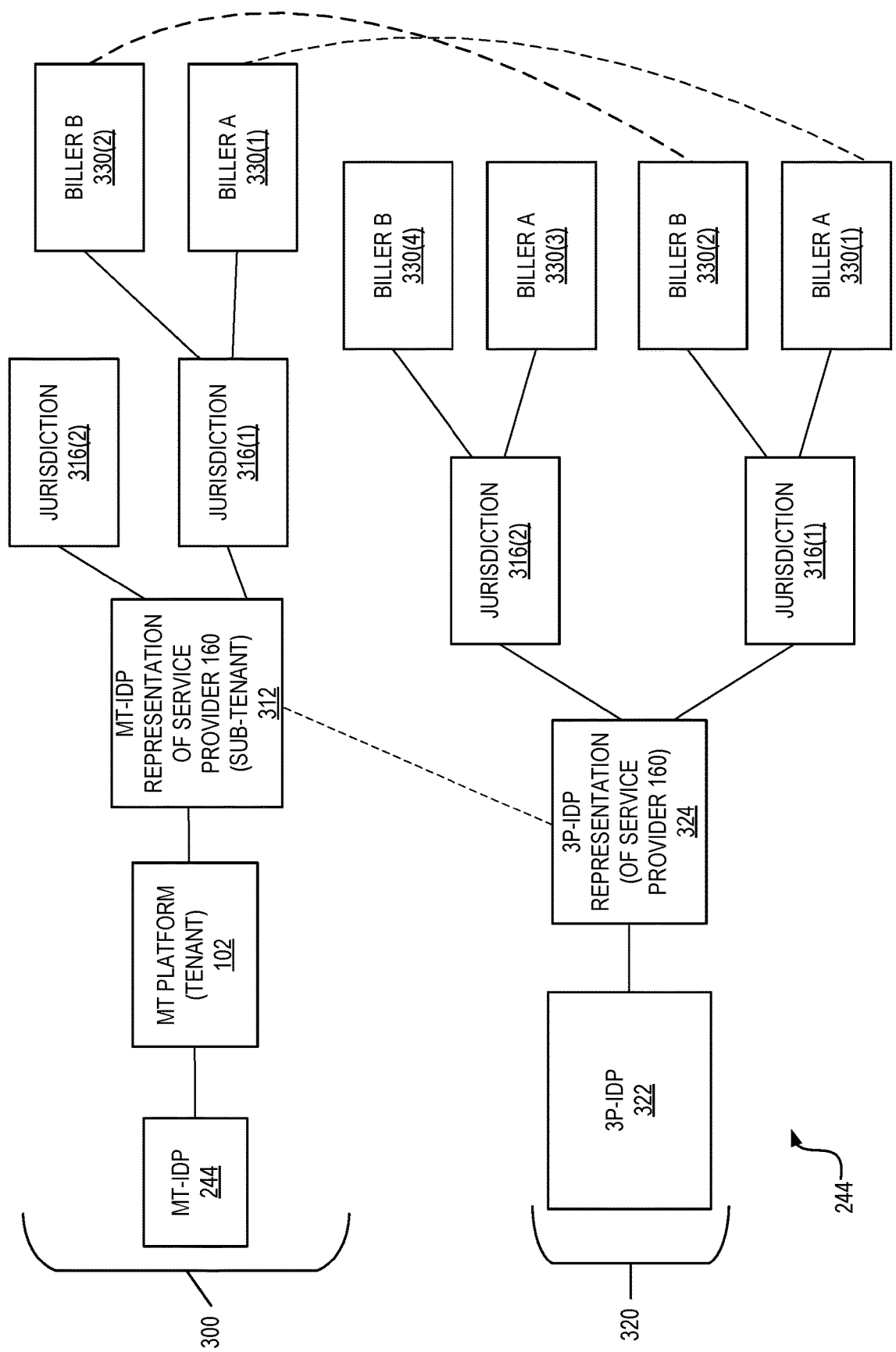
FIG. 3 is a diagram illustrating hierarchical data structures used by the multi-tenant software architecture systems that provide unified identity services.
Figure 4:
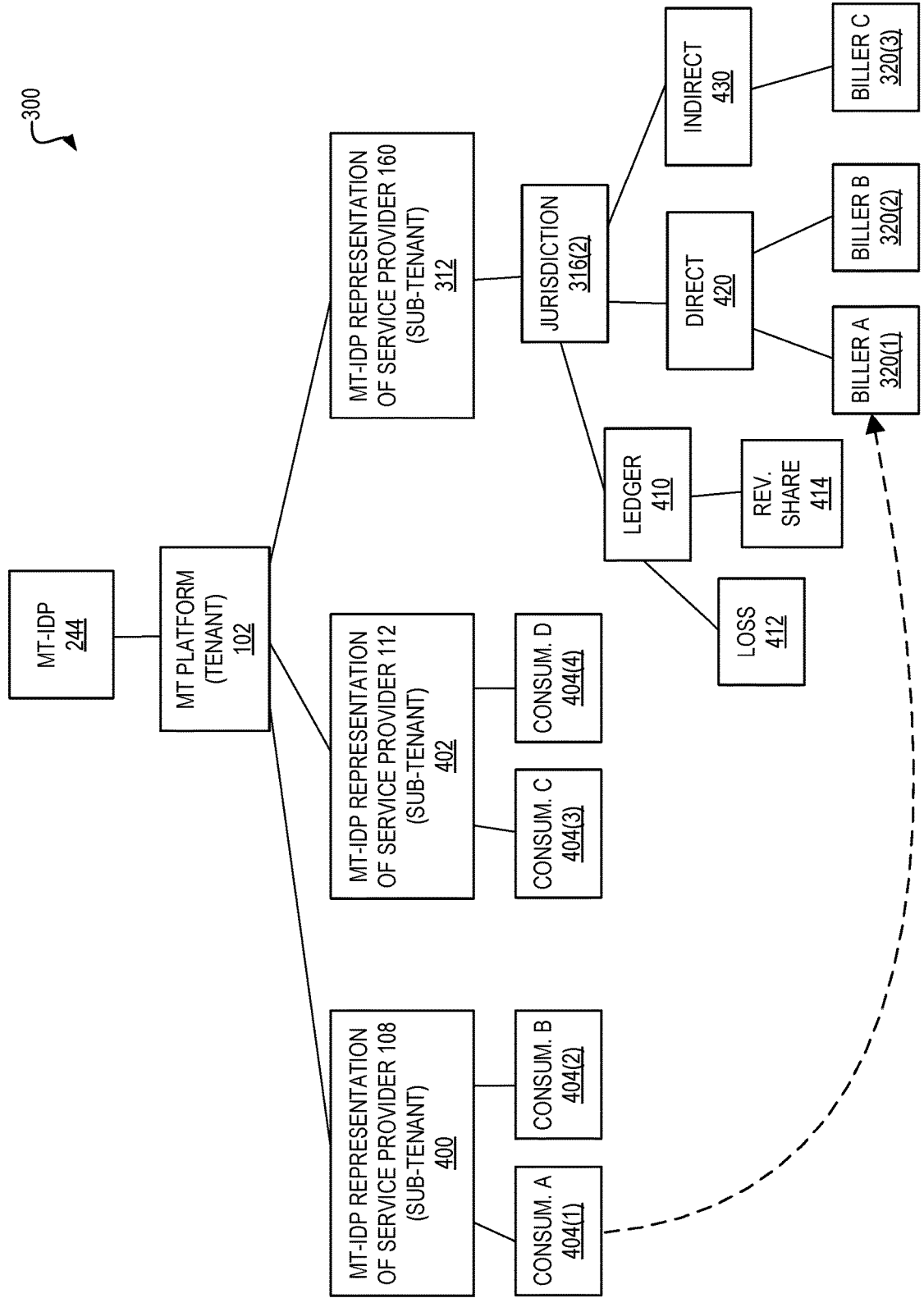
FIG. 4 is another diagram illustrating hierarchical data structures used by the multi-tenant software architecture systems that provide unified identity services.

FIGS. 3 and 4 are diagrams illustrating hierarchical data structures 244 used by multi-tenant platform 102 to provide unified identity services. FIG. 3 illustrates a hierarchical data structure 244 with a multi-tenant hierarchical data structure 300 that is managed by the MT-IDP 246 and a tenant hierarchical data structure 320 that represents in hierarchical data structure 244 a separate hierarchical data structure that is located at a service provider (e.g. service provider 160) and is managed by a 3P-IDP 322 (e.g., a 3P-IDP of service provider 160). The portions of hierarchical data structure 244 shown in FIG. 3 represent how an on-boarded service provider 160 (e.g., an entity interface tenant) and the multi-tenant platform 102 provide unified identity services to transaction requests between the service provider 160 and other service providers 108, 110, 112, 150. In various embodiments, therefore, a MT-IDP 246 may include a multi-tenant hierarchical data structure 300 that is managed by the MT-IDP 246 and any number of tenant hierarchical data structures 320 representing various separate hierarchical data structures that are located at various service providers and managed by various 3P-IDPs of the various service providers. Further, while only one service provider 160 is shown multiple service providers 160 may be present as discussed herein.

As shown in FIG. 3, multi-tenant hierarchical data structure 300 has five levels of hierarchy and tenant hierarchical data structure 320 has four levels of hierarchy. At the first level of the hierarchy, a root node entity represents MT-IDP 246. At a second level of the hierarchy, an entity represents multi-tenant platform 102 as a tenant and an entity represents 3P-IDP 322 as a secondary root node. At a third level of the hierarchy, an entity 312 represents service provider 160 within multi-tenant hierarchical data structure 300 as a sub-tenant and an entity represents service provider 160 within tenant hierarchical data structure 320. At a fourth level of the hierarchy, jurisdiction entities 316 represent jurisdictions, which are groups of billers 104A-N that share one or more characteristics (e.g., size, geographic region, etc.). At a fifth level of the hierarchy, biller entities 330 represent billers 104A-N. Although not shown in FIG. 3 (or FIG. 4), each of the biller entities 330 can include, as child nodes, one or more entities representing funding instruments of the billers 104A-N. Other nodes in FIGS. 3 and/or 4 can similarly have additional children nodes, as desired.

The organization and linking of the hierarchical data structure 244 of FIG. 3 can be referred to as a dependency graph. The dotted lines linking the biller entities 330(1) and 330(2) in multi-tenant hierarchical data structure 300 and biller entity 330(1) and 330(2) in tenant hierarchical data structure 320 indicate that the linked biller entities represent the same entity within the separate hierarchical data structures 300, 320. As also discussed herein in reference to FIG. 4, multi-tenant hierarchical data structure 300 includes representations of other services providers with child nodes also representing the linked biller entities. As referred to herein, therefore, the various biller entities 330 representing a particular biller A 104A and the links therebetween are the "unified identity" for that particular biller A 104A within hierarchical data structure 244. Further, hierarchical data structure 244 is a "unified hierarchical data structure" because it includes linked hierarchical data structures 300, 320. As discussed herein, such a unified hierarchical data structure is useable to provider a unified identity for requests between service providers and between service providers and outbound requests (e.g., to a transaction processing computer system 620 shown in FIG. 6). Similarly, the various consumer entities 404 (shown in FIG. 4) representing a particular end user and the links therebetween are the unified identity for that particular end user. In various instances, a node at a subsequent level of the hierarchy can inherit policies and configuration from its parent node in the hierarchy. The hierarchical data structure shows that the biller entities 330 are child nodes of jurisdiction nodes 316 that in turn are child nodes of respective representations of service provider 160, and thus are acted upon by the service provider 160 and its policies and configurations.

FIG. 4 is another diagram illustrating the multi-tenant hierarchical data structure 300 portion of hierarchical data structures 244 used by multi-tenant platform 102 to provide unified identity services. As with FIG. 3, at a first level of the hierarchy, a root node entity represents MT-IDP 246, and at a second level of the hierarchy, an entity represents multi-tenant platform 102 as a tenant. In FIG. 4, at a third level of the hierarchy the multi-tenant hierarchical data structure 300 includes entities 400 and 402 representing service providers 108 and 112 respectively as sub-tenants in addition to an entity 312 representing service provider 160 as a sub-tenant. At a fourth level of the hierarchy, consumer entities 404 represent various end users as child nodes of entities 400 and 402. Under entity 312, a jurisdiction entity 316 is at the fourth level of the hierarchy. In contrast to FIG. 3, in FIG. 4 a fifth level of the hierarchy includes another level of jurisdiction entities: ledger entity 410, direct biller entity 420, and indirect biller entity 430 in various embodiments. Ledger entity 410 represents a plurality of ledgers such as a loss ledger 412 and a revenue share ledger 414. Loss ledger 412 is useable to cover payments by the service provider (e.g., service provider 160) to the multi-tenant platform 102 to cover instances such as refunds and other reversals. Revenue share ledger 414 is useable to cover payments to the service provider (e.g., service provider 160) from the multi-tenant platform 102 representing the service provider's portion of the fees associated with transactions performed using multi-tenant platform 102 (e.g., 5% of the transaction amount). Direct biller entity 420 represents a group of billers 104A-N that are billed directly by multi-tenant platform 102 for fees and indirect biller entity 430 represents a group of billers 104A-N that are indirectly billed (e.g., that participate in a third-party bill pay system administered by a bank or credit card enterprise). In the latter instance, the entity that administered the third-party bill pay system is billed for usage of multi-tenant platform 102. Accordingly, such entities can use the multi-tenant platform 102 described herein as part of a white label bill pay solution.

As with FIG. 3, the organization and linking of the hierarchical data structures of FIG. 4 can be referred to as a dependency graph. In FIG. 4, the dashed line connecting consumer A 404(1) to biller A 320(1) indicates that a transaction for funds in a FI associated with consumer A 404(1) are being transferred to an FI associated with biller A 320(1) (e.g., to settle a bill as discussed herein). It is noted that the organization and type of the hierarchical data structures 300 is shown for illustrative purposes only, and that one or more of the 3P-IDP 204, 214, 224, 234, 312 and/or MT-IDP 246 can implement different data structures, as desired. In this case, the Identity-as-a-Service (IaaS) services can further map different schema used by the 3P-IDP to the multi-tenant hierarchical data structure 300. In various instances, a node at subsequent level of the hierarchy can inherit policies and configuration from its parent node in the hierarchy. The multi-tenant hierarchical data structure 300 shows, for example, that consumer A 404(1) and consumer B 404(2) are child nodes of entity 400 that in turn is a child node of the entity that represents multi-tenant platform 102, and thus are acted upon by the service provider 108 and its policies and configurations as well as the policies and configurations of multi-tenant platform 102.

In FIG. 4, some or all of the various entities 312, 316, 330 400, 402, 404, 410, 412, 414, 420, are 430 can be fully integrated into the multi-tenant platform 102 and managed by the MT-IDP 246 in various embodiments. In some embodiments some or all of the various entities 312, 316, 330 400, 402, 404, 410, 412, 414, 420, are 430 are not fully integrated into the multi-tenant platform 102, and are instead on-boarded onto the multi-tenant platform 102. Such on-boarded entities are managed by their respective 3P-IDP. For example, entities 400, 404(1), and 404(2) may be on-boarded but not fully integrated into the multi-tenant platform 102, and are managed by the 3P-IDP 204 in some embodiments.

During the process of onboarding (but not fully integrating) a service provider, the multi-tenant platform 102 can generate representations for the entities that are managed by that tenant's 3P-IDP. The multi-tenant platform 102 can generate these representations by generating linked entities. A linked entity is an entity that represents a corresponding entity in another hierarchical data structure, and that contains a limited amount of the data for that corresponding entity. For example, if consumer A 404(1) and consumer B 404(2) are linked entities, these entities are linked to a tenant hierarchical data structure corresponding to service provider 108 and managed by 3P-IDP 204. Additionally or alternatively, entities managed by 3P-IDPs can be represented by lightweight entities. A lightweight entity is an entity that represents a corresponding entity in another hierarchical data structure, and that contains some of the data for that corresponding entity. Thus, these types of representations can include a linked entities and lightweight entities. In some embodiments, a linked entity (e.g., a linked consumer or a linked merchant) is different from a lightweight entity (e.g., a lightweight merchant or a lightweight consumer) by is that the lightweight entity includes an additional amount of information for its corresponding entity, and the type can be chosen during onboarding. Referring again to FIG. 3, biller A 330(1) and biller B 330(1) in multi-tenant hierarchical data structure 300 are linked entities or lightweight entities in various embodiments and are managed by 3P-IDP 322 and/or other 3P-IDPs. Accordingly, in various instances a particular entity may be represented multiple times in multi-tenant hierarchical data structure 300 and multiple times in various tenant hierarchical data structures (e.g., 320, others not shown in FIGS. 3 and 4).

Figure 5:
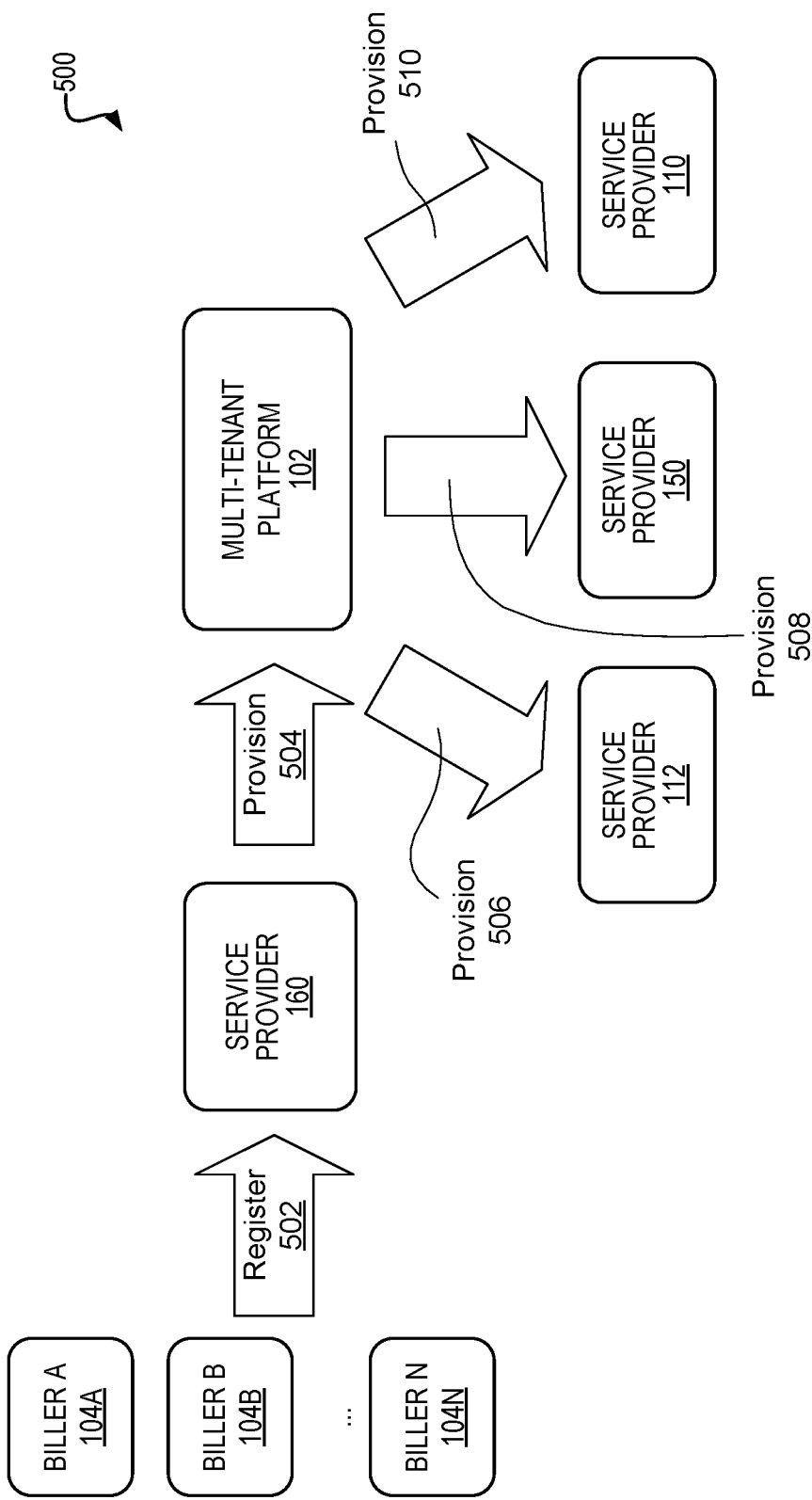
FIG. 5 is a flow diagram illustrating embodiments of operations for provisioning portions of the multi-tenant software architecture system.

Referring now to FIG. 5, a flow diagram illustrating a provisioning process 500 is depicted. In various instances, provisioning process 500 is performed when a new entity interface tenant (e.g., service provider 160) is on-boarded to multi-tenant platform 102 and/or when a new entity (e.g., a new biller 104) is on-boarded to an existing entity interface tenant. While the following discussion relates to an entity interface tenant using service provider 160 as an example, this is a non-limiting example and the provisioning process 500 may be performed for any on-boarded tenant including transaction processing service tenants. At 502, one or more billers 104A-N are registered with service provider 160. In embodiments in which service provider 160 manages its own identities with 3P-IDP 322, registration includes instantiating one or more representations for registered entities within tenant hierarchical data structure 320 as discussed in reference to FIG. 3.

At 504, representations (e.g., linked entities and/or lightweight entities) of registered entities are provisioned by multi-tenant platform 102 within multi-tenant hierarchical data structure 300. In various embodiments, service provider 160 is also provisioned as it is on-boarded including configuring policies 162. In various embodiments, ones of policies 162 are set according to policies 136 provided by multi-tenant platform 102. Additionally or alternatively, ones of policies 162 are set according to settings provided by biller A 104A (e.g., in configuration settings input by a user associated with biller A 104A). Accordingly, in various instances, policies 162 are set corresponding to settlement cutoffs, next day funding, transaction models useable to generate transaction request messages to other service providers (e.g., models that are useable to follow protocols used by other service providers or transaction processing computer systems), payout instructions (e.g., into which account(s) funds should be deposited), etc.

At 506, 508, and 510, service provider 160 is provisioned at service providers 112, 150, 110, respectively. In various embodiments, service provider 160 is provisioned at additional service providers (e.g., service provider 108). Provisioning at 506, 508, and 510 includes configuring the services providers 112, 150, 110 to be operable to accept requests from service provider 160. In various embodiments, such provisioning includes setting up cryptographic identifiers (e.g., passwords, cryptographic keys) useable to authenticate requests made by service provider 160 to the other service providers 112, 150, 110. In various embodiments, such provisioning includes generating additional representations of the various billers in respective tenant hierarchical data structures maintained by the respective 3P-IDPs of the respective service providers and linking these additional representations to the representations generated at 502 and 504.

Once the billers 104A-N have been registered with service provider 160 and the biller A 104A and service provider 160 are provisioned at multi-tenant platform 102 and service providers 112, 150, 110, service provider 160 is operable to receive requests from biller A 104A to process transactions and to send request to other service providers to process the transactions. Because the various service providers are able to maintain their own tenant hierarchy data structures and facilitate transactions between the service providers by linking representations when appropriate, the various service providers are able to structure their tenant hierarchy data structures in different ways. For example, various tenant hierarchy data structures may user separate namespaces, different levels of hierarchy, or different data types. This allows legacy tenant hierarchy data structures to be linked without the burden or restructuring.

Figure 6:
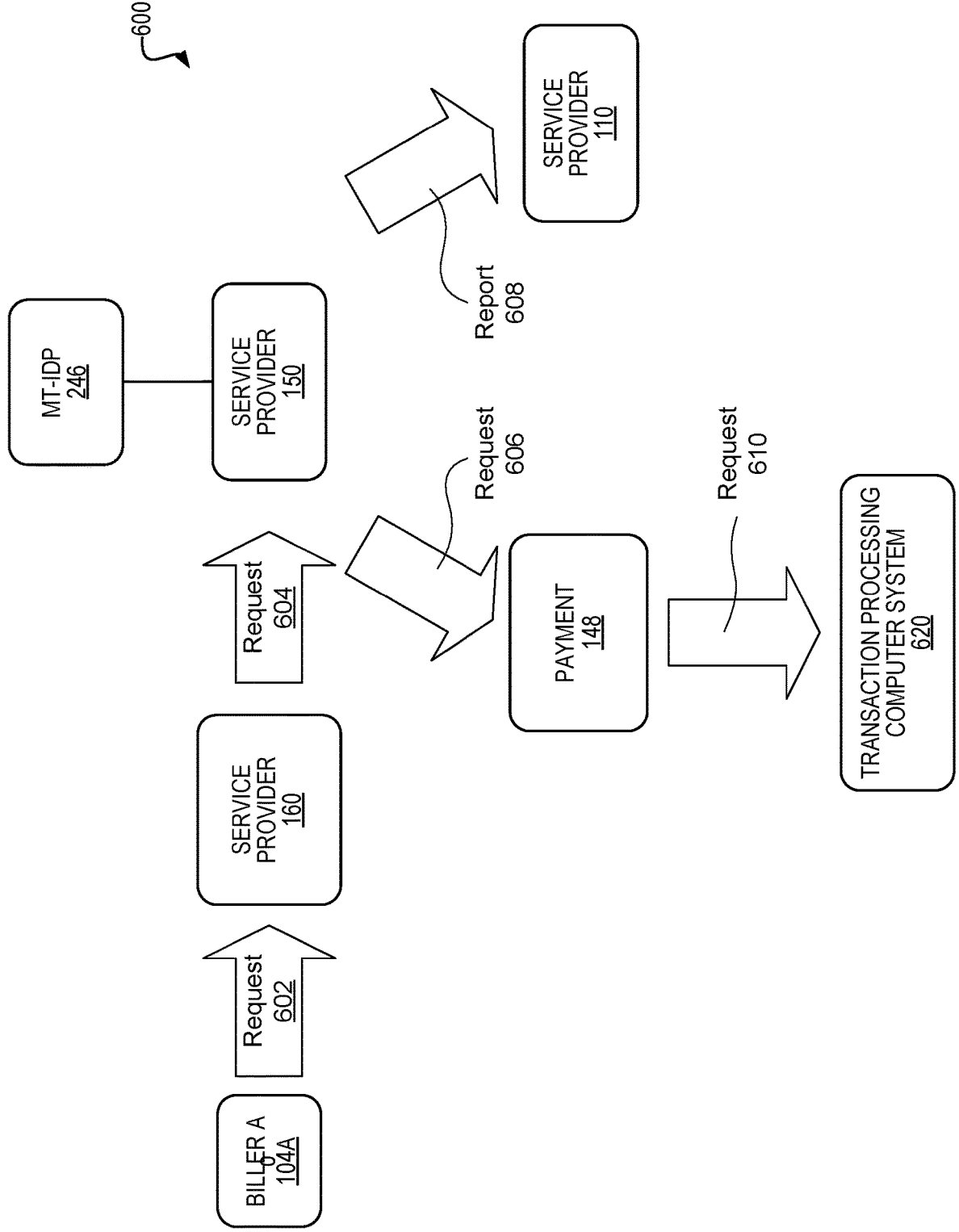
FIGS. 6 and 7 are flow diagrams illustrating embodiments of operations for facilitating a transaction between services of tenants of a multi-tenant platform.

Referring now to FIG. 6, a flow diagram illustrating a pay-in transaction processing process 600 is depicted. In various embodiments, process 600 is performed when a biller A 104A interfaces with an entity interface tenant of a multi-tenant platform 102 to receive payment from an end user for a bill. Process 600 begins when biller A 104A sends request 602 to an entity interface service of entity interface tenant of service provider 106 to process a transaction. In various embodiments, request 602 includes an indication of the particular form of payment (e.g., peer-to-peer payment processing system, ACH, credit card). In various embodiments, request 602 is generated as a result of an end user accessing a website or app associated with biller A 104A and entering payment information to settle a bill. In other embodiments, request 602 is generated automatically as part of an automatic bill pay service. Having received request 602, service provider 160 sends request 604 to a transaction processing service tenant (e.g., service provider 150 as shown in FIG. 6, but any appropriate transaction processing service tenant can be used depending on the selected form of payment used in process 600). In various embodiments, service provider 160 sends request 604 through multi-tenant platform 102, but in other embodiments service provider 160 sends request 604 directly to the second service provider. In various embodiments, request 604 includes information useable to perform the transaction (e.g., an amount for the transaction, an indication of the end user) as well as information from relevant policies 162 (e.g., a settlement cutoff policy set by service provider 160, a settlement cutoff policy set by biller A 104A, a next day funding instruction). Service provider 150 authenticates request 604 using MT-IDP 246 and hierarchical data structure 244.

In various embodiments, various service providers 108, 112, 150 are operable to interface with various transaction processing computer systems 620 to process transactions. As discussed herein, such transactions include pay-in transactions discussed in connection to FIG. 6 and payout transactions discussed in connection to FIG. 7. In embodiments in which the transaction is a transfer of funds, transaction processing computer system 620 may also be referred to as a "payment computer system." As discussed herein, in various embodiments a first transaction processing computer system 620 is a peer-to-peer payment processing system, a second transaction processing computer system 620 is an ACH transfer system, a third transaction processing computer system 620 is a credit card processing system, etc. Transaction processing computer systems 620 include various services operable to transfer funds from one account to another. In the context of process 600, funds are transferred from an end user's account to a settlement account corresponding to multi-tenant platform 102 in various embodiments. As discussed below in reference to FIG. 7, in the context of process 700 funs are transferred from a settlement account corresponding to multi-tenant platform 102 to a biller's account in various embodiments. Transaction processing computer systems 620 may include, for example, servers associated with a payment processing service and one or more banks.

Having authenticated request 604, service provider 150 interfaces with the transaction processing computer system 620 corresponding to the form of payment indicated in request 604 via request 606. In various embodiments, request 606 is generated using the policies corresponding to the particular form of payment and a representation of the payment computer system (e.g., in the hierarchical data structure 244). For example, such a representation may be an FI 239 as discussed in reference to FIG. 2. In various embodiments, transaction messaging logic that corresponds to the form of payment indicated in request 604 executed in service 153 of service provider 150 generates request 606 using appropriate formatting and protocols corresponding to transaction processing computer system 620. Information such as next day funding instructions and settlement cutoff policies are included in various instances. Payment service 148 of multi-tenant platform 102 facilitates communication with transaction processing computer systems 620 by sending request 606 outbound from multi-tenant platform 102 to the transaction processing computer system 620 corresponding to the particular form of payment indicated in request 602. In some embodiments, MT-transaction processor 101 modifies request 606 into request 610 (e.g., to add cryptographic identifiers, to encrypt request 606, etc.).

After receiving the request 606 (or 610), transaction processing computer system 620 processes the transaction request, and if the request is granted, transfers funds from the end user's account. In various embodiments, funds are transferred into a settlement account associated with multi-tenant platform 102. The next day funding instructions and settlement time polices, if received by transaction processing computer system 620 with adequate time to process the transaction before the settlement time, will enable the biller A 104A to receive funds on the next day. In some embodiments, such as ACH transfers, the actual time to process a transaction is two days ore more, but because of the existing relationship between multi-tenant platform 102 and transaction processing computer system 620 and the ability to charge back incorrectly transferred funds, the funds can be made available the next day.

Once the funds have been made available, in various embodiments, service provider 150 also sends report 608 to another service provider (e.g., service provider 110 but others may be used in various embodiments). In various embodiments, service provider 110 compiles comprehensive reports indicating payments credited to biller A 104A. In various embodiments, service provider 110 receives reports 608 for successful transactions credited to biller A 104A for multiple forms of payment, and is operable to generate reports for biller A 104A indicating transactions across the multiple forms of payment.

Figure 7:
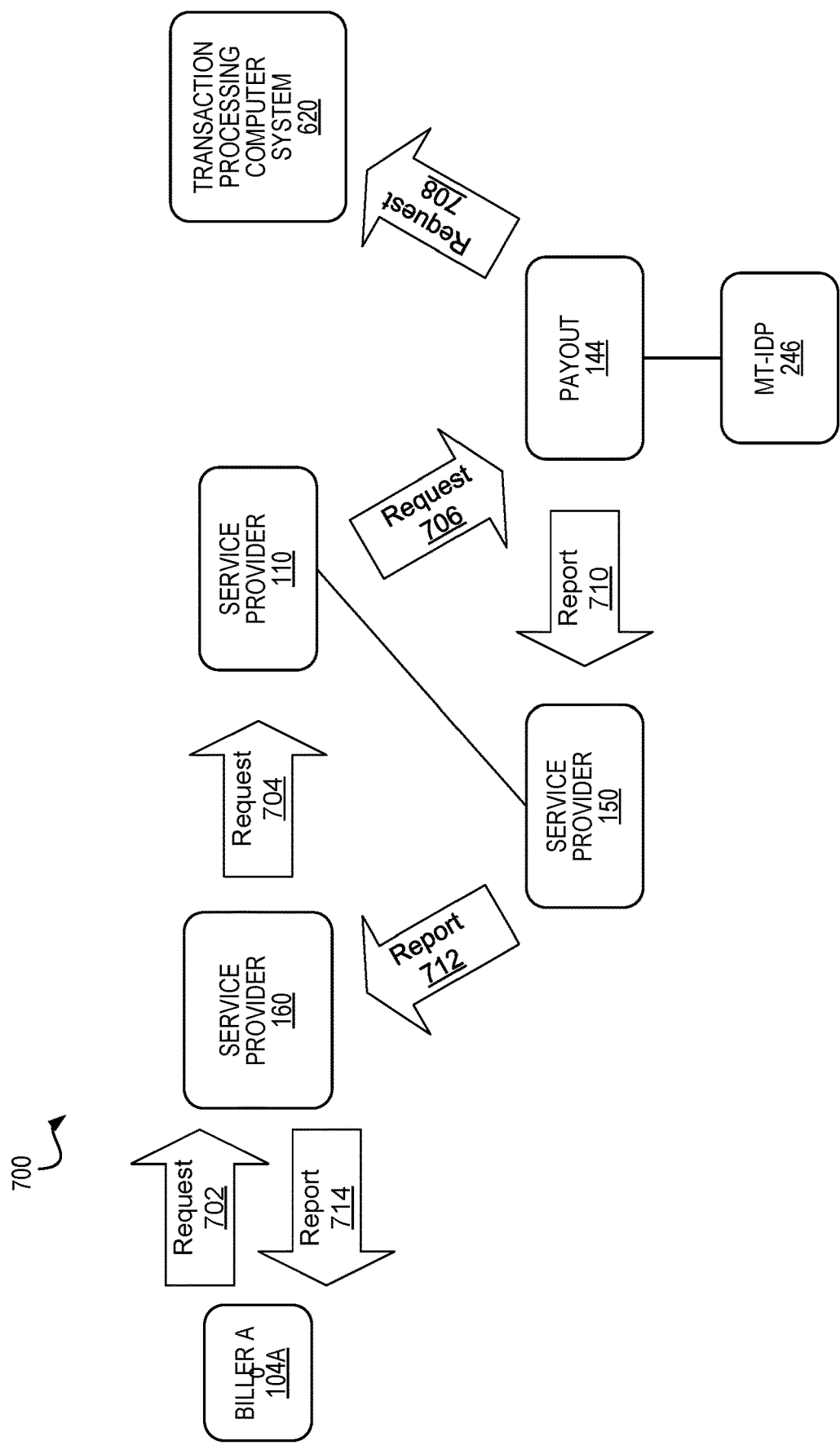

Referring now to FIG. 7, a flow diagram illustrating a payout transaction processing process 700 is depicted. In various embodiments, process 700 is performed in response to a biller A 104A requesting a payout of funds credited to it in the settlement account corresponding to multi-tenant platform 102. Process 700 begins when a biller A 104A sends a payout request 702 to an entity interface service of an entity interface tenant of multi-tenant platform 102 (e.g., service 163 of service provider 160). In various embodiments, request 702 is generated in response to a user associated with biller A 104A inputting one or more commands, but in other embodiments request 702 is generated automatically (e.g., according to a daily schedule, a weekly schedule, etc.). In various embodiments, payout request 702 includes instructions indicating to which of biller's 104 accounts the payout should be deposited, when a payout should be deposited, etc.

In response to receiving payout request 702 and authenticating request 702 using hierarchical data structure 244, service provider 160 sends a payout request 704 to a transaction processing service of a transaction processing service tenant of multi-tenant platform 102 (e.g., service 120 of service provider 110). In various embodiments, service provider 160 sends payout request 704 through multi-tenant platform 102, but in other embodiments service provider 160 sends request 704 directly to service provider 110. In various embodiments, request 704 includes information useable to perform the transaction (e.g., an amount for the transaction, an indication of the biller A 104A) as well as information from relevant policies 162 (e.g., a billing policy).

In response to payout request 704 and authenticating request 704 using MT-IDP 246 and hierarchical data structure 244, service provider 110 interfaces with the transaction processing computer system 620. In various embodiments, request 706 is generated using the policies corresponding to the particular form of payment and a representation of the payment computer system (e.g., in the hierarchical data structure 244). For example, such a representation may be an FI 219 as discussed in reference to FIG. 2. In various embodiments, transaction messaging logic that corresponds to payout transactions via transaction processing computer system 620 generates request 706 using appropriate formatting and protocols corresponding to transaction processing computer system 620. Payout service 144 of multi-tenant platform 102 facilitates communication with transaction processing computer systems 620 by sending request 706 outbound from multi-tenant platform 102 to the transaction processing computer system 620. In some embodiments, payout service 144 modifies request 706 into request 708 (e.g., to add cryptographic identifiers, to encrypt request 706, etc.).

After receiving the payout request 706 (or 708), transaction processing computer system 620 processes the payout request, and if the request is granted, transfers resulting funds that were received from various end user's account (e.g., after one or more processes 600). In various embodiments, funds are transferred from the settlement account associated with multi-tenant platform 102 to an account associated with biller A 104A.

Once the funds have been deposited into an account associated with biller A 104A, in various embodiments, payout service 144 also sends report 710 to another service provider (e.g., service provider 150 but others may be used in various embodiments). In various embodiments, service provider 150 communicates with service provider 110 to compile comprehensive reports indicating payments credited to biller A 104A and/or to calculate services fees (e.g., based on a percentage of the payout amount) to chart to biller A 104A. Referring back briefly to FIG. 6, in various embodiments, service provider 110 receives reports 608 for successful transactions credited to biller A 104A for multiple forms of payment, and is operable to generate reports for biller A 104A indicating transactions across the multiple forms of payment. Returning to FIG. 7, in some of such embodiments service provider 110 and service provider 150 work together to prepare report 712. Service provider 150 is operable to send report 712 to service provider 160 for dissemination to biller A 104A as report 714. Biller A 104A may receive report 714 in any of a number of ways including in a dashboard presented on a website interface of service provider 160 or in an email.

Figure 8:
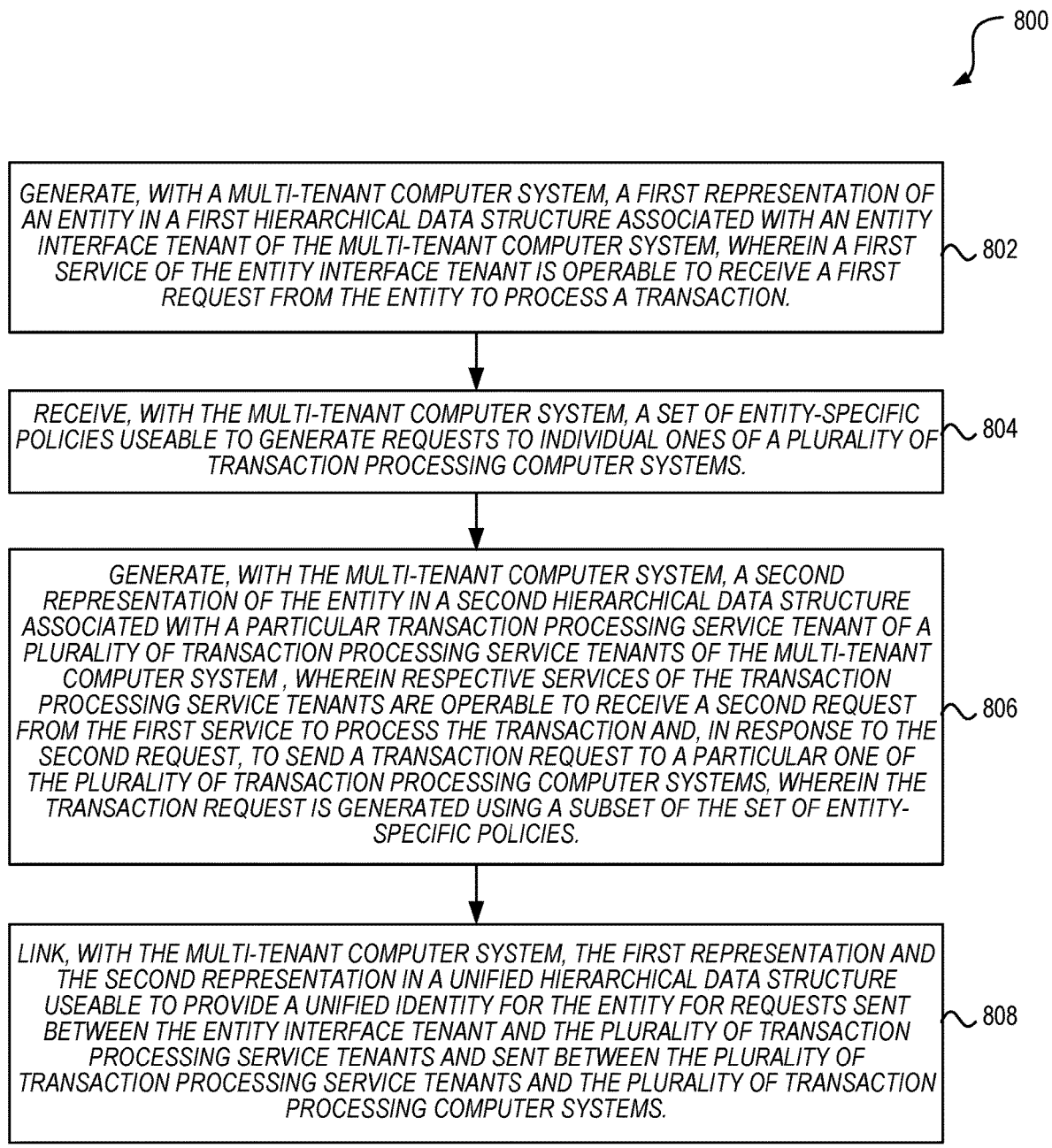
FIG. 8 is a flow chart illustrating an embodiment of a method for generating a hierarchical data structure in accordance with the disclosed embodiments.
Figure 9:
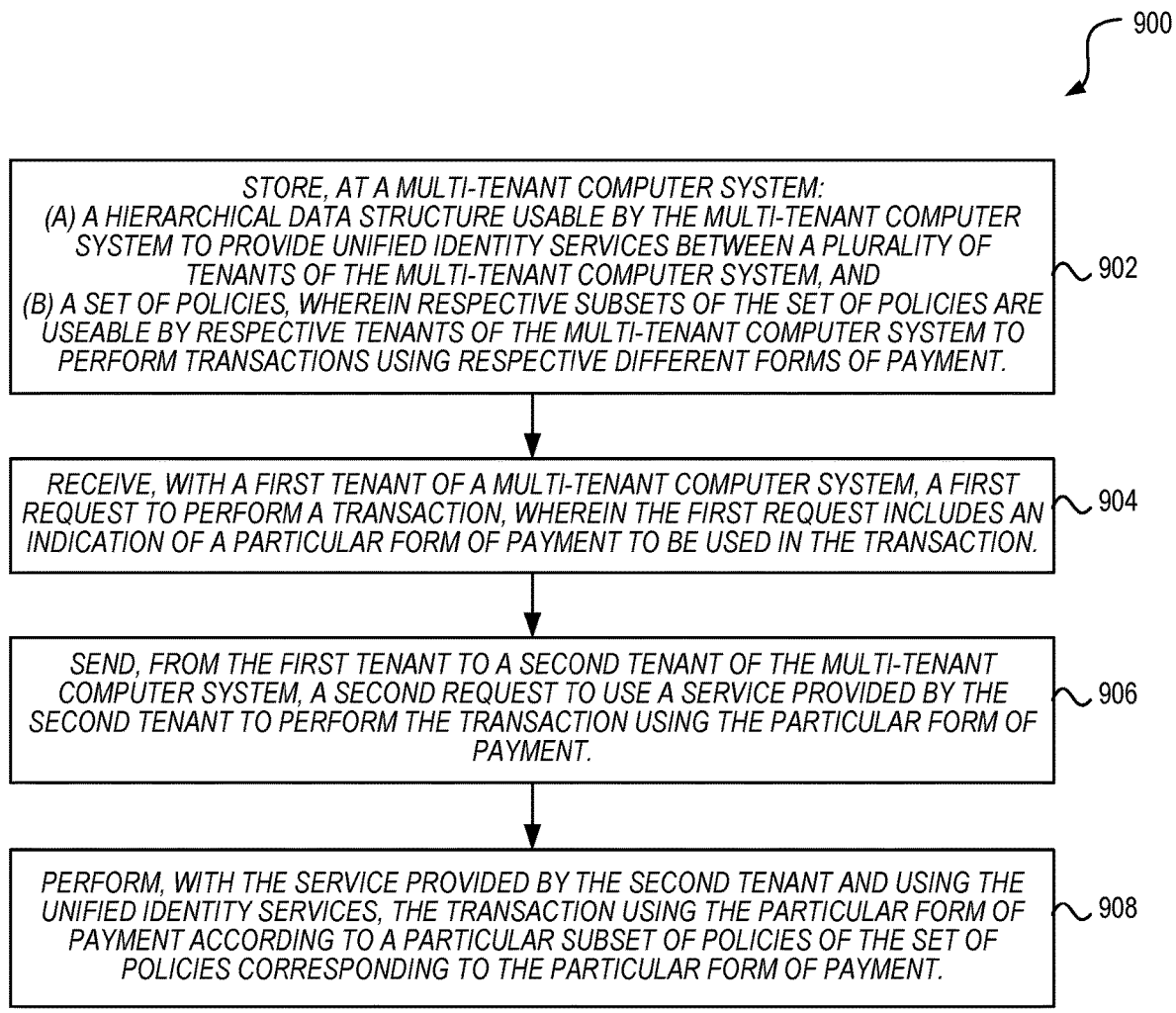
FIG. 9 is a flow chart illustrating an embodiment of a method of performing a transaction generating a hierarchical data structure in accordance with the disclosed embodiments.

FIGS. 8 and 9 are diagrams illustrating embodiments of operations for facilitating a transaction using service providers of the multi-tenant platform 102 using hierarchical data structure 244. The operations of FIGS. 8 and 9 are described with reference to the systems and components described in FIGS. 1-7 (for illustration purposes and not as a limitation). The example operations can be carried out by the multi-tenant platform 102 in various embodiments.

Referring now to FIG. 8, a flow chart depicting a method 800 for generating a hierarchical data structure 244 is shown. At block 802, a multi-tenant computer system (e.g., a computer system implementing multi-tenant platform 102) generates a first representation of an entity (e.g., a biller 104) in a first hierarchical data structure (e.g., a tenant hierarchical data structure 320) associated with an entity interface tenant of the multi-tenant computer system (e.g., a service provider 160), wherein a first service (e.g., service 163) of the entity interface tenant is operable to receive a first request (e.g., request 602, 702) from the entity to process a transaction. At block 804, the multi-tenant computer system receives a set of entity-specific policies (e.g., policies 162) useable to generate requests (e.g., requests 604 or 704, which are useable to generate request 606, 610 and payout requests 706, 708, respectively) to individual ones of a plurality of transaction processing computer systems (e.g., one or more transaction processing computer systems 620). At block 806, the multi-tenant computer system generates a second representation of the entity in a second hierarchical data structure (e.g., a second tenant hierarchical data structure) associated with a particular transaction processing service tenant of a plurality of transaction processing service tenants of the multi-tenant computer system (e.g., one or service provider 108, 110, 112, 160). In various embodiments, respective services of the transaction processing service tenants (e.g., services 116, 120, 124, 153) are operable to receive a second request (e.g., requests 604, 704) from the first service to process the transaction and, in response to the second request, to send a transaction request (e.g., requests 606, 610, 706, 708) to a particular one of the plurality of transaction processing computer systems, wherein the transaction request is generated using a subset of the set of entity-specific policies. At block 808, the multi-tenant computer system links the first representation and the second representation in a unified hierarchical data structure (e.g., hierarchical data structure 244) useable to provide a unified identity for the entity for requests sent between the entity interface tenant and the plurality of transaction processing service tenants and sent between the plurality of transaction processing service tenants and the plurality of transaction processing computer systems.

Referring now to FIG. 9, a flow chart depicting a method 900 of performing a transaction using hierarchical data structure 244 is shown. At block 902, a multi-tenant computer system (e.g., a computer system implementing multi-tenant platform 102) stores a hierarchical data structure (e.g., hierarchical data structure 244) useable by the multi-tenant computer system to provide unified identity services between a plurality of tenants of the multi-tenant computer system (e.g., service providers 108, 110, 112, 150, 160), and a set of policies (e.g., policies 123, 125, 127, 136, 152, 162), wherein respective subsets of the set of policies are useable by respective tenants of the multi-tenant computer system to perform transactions using respective different forms of payment. At block 904, a first tenant of the multi-tenant computer system (e.g., service provider 160) receives a first request (e.g., request 602, 702) to perform a transaction. In various embodiments, the first request includes an indication of a particular form of payment to be used in the transaction. At block 906, the first tenant sends to a second tenant of the multi-tenant computer system (e.g., service provider 108, 110, 112, 150) a second request (e.g., request 604, 704) to use a service provided by the second tenant (e.g., services 116, 120, 124, 153) to perform the transaction using the particular form of payment. At block 908, the service provided by the second tenant performs, using the unified identity services, the transaction using the particular form of payment according to a particular subset of policies (e.g., policies 123, 125, 127, 152) of the set of policies corresponding to the particular form of payment.

In a non-limiting example of an implementation of the techniques disclosed herein, a utility company is a biller A 104A that desires to facilitate payment of utility bills by its end users via an app and its website. The utility company offers its end users the ability to pay their utility bills using at least four different forms of payment: payment by electronic check via ACH, payment by credit card, payment by PAYPAL peer-to-peer payment, and payment by VENMO peer-to-peer payment. When an end user selects their desired form of payment and enters the relevant information on the utility company's website and requests that the transaction be processed, the utility company's website sends a request 602 to an entity interface tenant of a multi-tenant platform 102. The multi-tenant platform 102 processes the transaction according to the actions discussed herein in reference to FIG. 6. Once the transaction has been processed, the utility company's website may notify the end user that the transaction was successful and funds from the end user have been deposited into a settlement account. In some embodiments, the funds from the end user are deposited in the settlement account the day after the end user requested that the transaction be processed. Thus, a plurality of end users is able to pay the utility company for their utility bills using various forms of payment. Subsequently, the utility company requests a payout of the funds in the settlement account as well as a report that is indicative of the payments made the previous day across the various available forms of payment. Thus, multi-tenant platform 102 performs the actions discussed herein in reference to FIG. 7, and the utility company is provided with the report and is notified that the funds from various end users have been deposited into the utility company's account.

It should be understood that FIGS. 1-9 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 5, 6, and/or 7 as well as the flow charts of FIGS. 8 and/or 9 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 10:
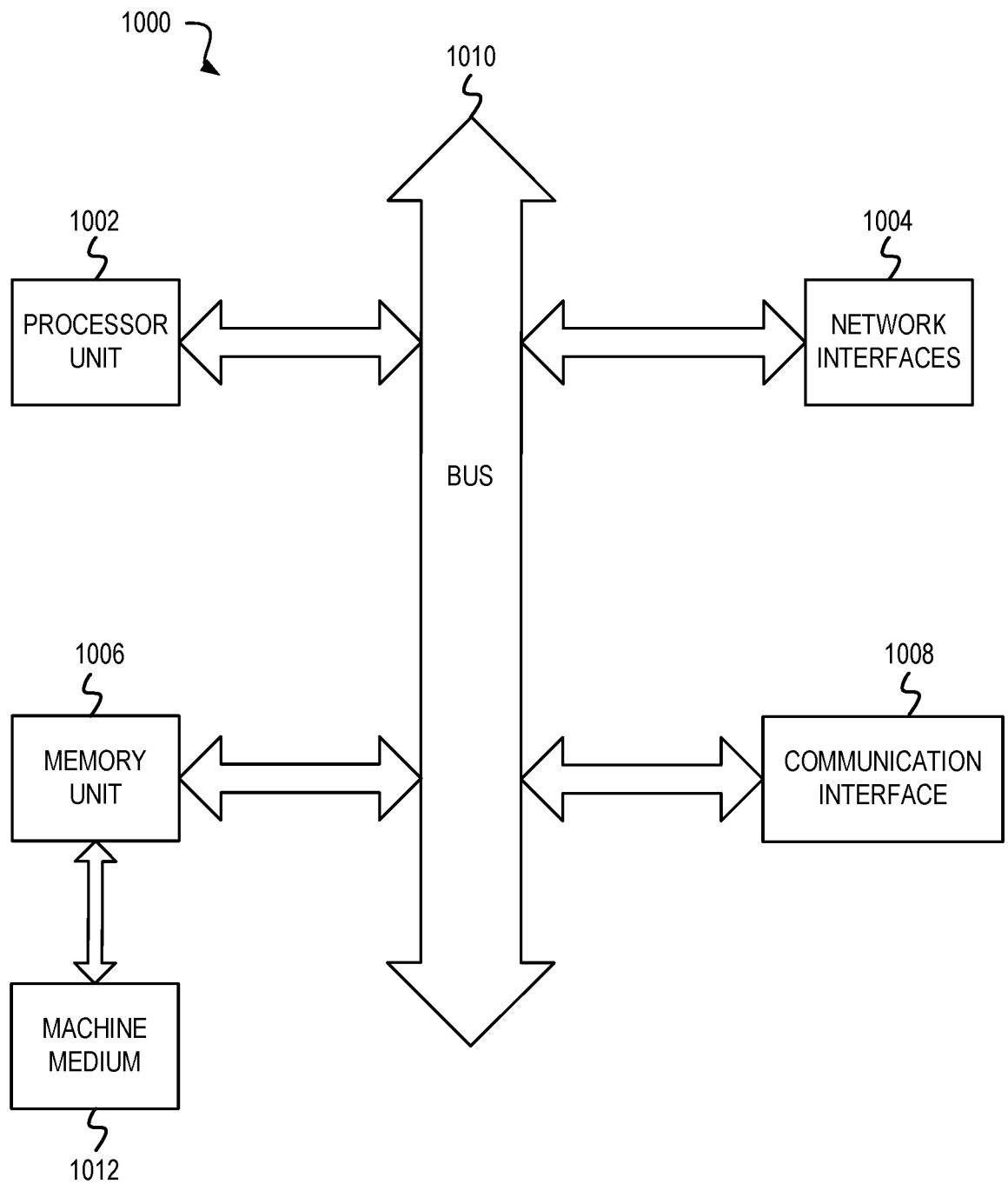
FIG. 10 is a block diagram illustrating embodiments of electronic devices used in the computer systems of FIGS. 1-9.

FIG. 10 is a block diagram of one embodiment of an electronic device 1000 used in the computer systems of FIGS. 1-9. In some implementations, the electronic device 1000 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 1000 can include a processor unit 1002 (possibly including multiple processors, multiple cores, multiple nodes, and/or implementing multi-threading, etc.). The electronic device 1000 can also include memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 can also include a bus 1010 (e.g., PCI, ISA, PCI-Express, HyperTransport®, InfiniBand®, NuBus, AHB, AXI, etc.), and network interfaces 1004 can include wire-based interfaces (e.g., an Ethernet interface, a powerline communication interface, etc.). The electronic device 1000 includes a communication interface 1008 for network communications. The communication interface 1008 can include at least one of a wireless network interface (e.g., a WLAN interface, a Bluetooth interface, a WiMAX interface, a ZigBee interface, a Wireless USB interface, etc.), In some implementations, the electronic device 1000 may support multiple network interfaces—each of which is configured to couple the electronic device 1000 to a different communication network.

The memory unit 1006 can embody functionality to implement embodiments described in FIGS. 1-6 above. In one embodiment, the memory unit 1006 can include one or more of functionalities for using unified identity services in a multi-tenant architecture system. Any one of these functionalities may be partially (or entirely) implemented in hardware and/or on the processor unit 1002. For example, some functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, memory unit 1006, the network interfaces 1004, and the communication interface 1008 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the present disclosure is not limited to them. In general, techniques for using unified identity services in a multi-tenant architecture system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:
1. A method comprising:
   storing, at a multi-tenant computer system,
      a hierarchical data structure usable by the multi-tenant computer system to provide unified identity services between a plurality of tenants of the multi-tenant computer system, and
      a set of policies, wherein respective subsets of the set of policies are useable by respective tenants of the multi-tenant computer system to perform transactions using respective different forms of payment;
   receiving, with a first tenant of the multi-tenant computer system, a first request to perform a transaction, wherein the first request includes an indication of a particular form of payment to be used in the transaction;
   sending, from the first tenant to a second tenant of the multi-tenant computer system, a second request to use a service provided by the second tenant to perform the transaction using the particular form of payment, wherein the second request includes a particular subset of policies of the set of policies associated with the first tenant; and
   in response to an authentication of the second request using the unified identity services, performing, with the service provided by the second tenant, the transaction using the particular form of payment according to the particular subset of policies.

2. The method of claim 1, further comprising:
    storing, at the multi-tenant computer system, transaction messaging logic for individual ones of the plurality of tenants; and
    wherein performing the transaction includes the service sending one or more transaction messages to a payment computer system corresponding to the particular form of payment, wherein the one or more transaction messages are generated using the transaction messaging logic corresponding to the second tenant and the particular subset of policies.

3. The method of claim 1, wherein the particular subset of policies includes a transaction settlement time of the particular form of payment, and wherein performing the transaction includes the service sending one or more transaction messages to a payment computer system corresponding to the particular form of payment, wherein the one or more transaction messages include a request to perform the transaction before the transaction settlement time such that funds are available for dispersal the following day.

4. The method of claim 1,
    wherein receiving the first request includes using a first representation of an entity;
    wherein performing the transaction includes using a second representation of the entity; and
    wherein the hierarchical data structure includes a representation of the first tenant and a representation of the second tenant at a first level of a hierarchy and the first representation and the second representation at a second level of the hierarchy.

5. The method of claim 4, wherein the entity is a biller, the first tenant is a bill payment platform, the second tenant is a payment processing platform, and the transaction is a payment to the biller for a bill.

6. The method of claim 4,
    wherein the first representation of the entity corresponds to a third representation of the entity in a first tenant hierarchical data structure of the first tenant; and
    wherein the second representation of the entity corresponds to a fourth representation of the entity in a second tenant hierarchical data structure of the second tenant.

7. The method of claim 1, wherein the first request is received from an entity, wherein a result of the transaction is a deposit into a settlement account associated with the multi-tenant computer system; the method further comprising:
    performing, using a service provided by a third tenant of the multi-tenant computer system, a transfer of the deposit into a financial account of the entity.

8. The method of claim 1, wherein the first request is received from an entity, the method further comprising:
    generating, with a service provided by a third tenant of the multi-tenant computer system, a report indicative a plurality of transactions performed during a time period in response to requests from the entity, wherein the plurality of transactions was performed using individual ones of the different forms of payment.

9. The method of claim 1,
    wherein the different forms of payment include at least four different forms of payment,
    wherein the set of policies include different subsets of policies for individual ones of the different forms of payment,
    wherein performing the transaction includes the service sending one or more transaction messages to a payment computer system corresponding to the particular form of payment; and
    wherein the one or more transaction messages are generated using the subset of policies for the particular form of payment and a representation of the payment computer system in the hierarchical data structure.

10. A non-transitory, computer-readable medium storing instructions that when executed by a computer system cause the computer system to perform operations comprising:
    storing, at a multi-tenant computer system, a hierarchical data structure usable by the multi-tenant computer system to provide unified identity services between a plurality of tenants of the multi-tenant computer system, wherein the hierarchical data structure includes a first representation of an entity and a second representation of the entity, wherein the first representation corresponds to a first tenant of the multi-tenant computer system and the second representation corresponds to a second tenant of the multi-tenant computer system;
    receiving, with the first tenant and using the first representation, a first request to perform a transaction, wherein the first request includes an indication of a particular form of payment to be used in the transaction;
    sending, from the first tenant to the second tenant, a second request to use a service provided by the second tenant to perform the transaction using the particular form of payment, wherein the second tenant is operable to authenticate the second request using the second representation and the unified identity services; and
    in response to authenticating the second request, sending, by the service provided by the second tenant using the second representation, one or more transaction messages outbound from the multi-tenant computer system to perform the transaction using the particular form of payment.

11. The computer-readable medium of claim 10, the operations further comprising:
    storing, at the multi-tenant computer system, a set of policies, wherein respective subsets of the set of policies are useable by respective tenants of the multi-tenant computer system to perform transactions using respective different forms of payment;
    wherein the one or more transaction messages are generated using the subset of policies for the particular form of payment.

12. The computer-readable medium of claim 10,
    wherein the hierarchical data structure includes a third representation of the entity, wherein the third representation corresponds to a third tenant of the multi-tenant computer system;
    the operations further comprising:
    receiving, with the first tenant and using the first representation, a third request for a payout from a settlement account into which resulting funds from the transaction are deposited;
    sending, from the first tenant to the third tenant, a fourth request to use a service provided by the third tenant pay out the resulting funds into a financial account of the entity, wherein the third tenant is operable to authenticate the fourth request using the third representation and the unified identity services; and sending, using the service provided by the third tenant using the third representation, one or more payout instruction messages outbound from the multi-tenant computer system.

13. The computer-readable medium of claim 10, the operations further comprising:

generating, with a service provided by a third tenant of the multi-tenant computer system, a report indicative a plurality of transactions performed during a time period in response to requests from the entity, wherein the plurality of transactions was performed using individual ones of a plurality of different forms of payment.

14. The computer-readable medium of claim 10, wherein the one or more transaction messages include next day funding instructions.

15. A method comprising:

storing, by a multi-tenant computer system in a hierarchical data structure, a first representation of an entity, the first representation corresponding to a first tenant of the multi-tenant computer system;

storing, by the multi-tenant computer system in the hierarchical data structure, a second representation of the entity, the second representation corresponding to a second tenant of the multi-tenant computer system;

receiving, by the multi-tenant computer system from the first tenant using the first representation, a first request to perform a transaction, wherein the first request includes an indication of a particular form of payment to be used in the transaction;

sending, by the multi-tenant computer system to the second tenant, a second request to use a service provided by the second tenant to perform the transaction using the particular form of payment, wherein the second tenant is operable to authenticate the second request using the second representation; and in response to successfully authenticating the second request, requesting, by the multi-tenant computer system using the second representation and one or more transaction messages, the second tenant to perform the transaction using the particular form of payment.

16. The method of claim 15, further comprising:

storing, at the multi-tenant computer system, a set of policies, wherein respective subsets of the set of policies are useable by respective tenants of the multi-tenant computer system to perform transactions using respective different forms of payment;

wherein the one or more transaction messages are generated using the subset of policies for the particular form of payment.

17. The method of claim 15, wherein the hierarchical data structure includes a third representation of the entity, wherein the third representation corresponds to a third tenant of the multi-tenant computer system; and further comprising:

receiving, with the first tenant and using the first representation, a third request for a payout from a settlement account into which resulting funds from the transaction are deposited;

sending, from the first tenant to the third tenant, a fourth request to use a service provided by the third tenant pay out the resulting funds into a financial account of the entity, wherein the third tenant is operable to authenticate the fourth request using the third representation; and sending, using the service provided by the third tenant using the third representation, one or more payout instruction messages outbound from the multi-tenant computer system.

18. The method of claim 15, wherein the first representation of the entity corresponds to a third representation of the entity in a first tenant hierarchical data structure of the first tenant; and wherein the second representation of the entity corresponds to a fourth representation of the entity in a second tenant hierarchical data structure of the second tenant.

19. The method of claim 15, further comprising:

generating, with a service provided by a third tenant of the multi-tenant computer system, a report indicative a plurality of transactions performed during a time period in response to requests from the entity, wherein the plurality of transactions was performed using individual ones of a plurality of different forms of payment.

20. The method of claim 15, wherein the one or more transaction messages include next day funding instructions.

* * * * *